US007292424B2

(12) United States Patent
Takasu et al.

(10) Patent No.: US 7,292,424 B2
(45) Date of Patent: Nov. 6, 2007

(54) ARCING HORN DEVICE

(75) Inventors: Kazuhiko Takasu, Yokosuka (JP); Takashi Chino, Yokosuka (JP); Osamu Usuda, Osaka (JP); Toshio Watanabe, Osaka (JP); Tomoyasu Hasegawa, Osaka (JP); Kazuhiko Shimoda, Osaka (JP); Satoru Doi, Osaka (JP); Takehiko Kikuchi, Tokyo (JP); Katsuyuki Urasawa, Tokyo (JP); Hiroaki Kanatsuji, Tokyo (JP); Yoshihiko Ota, Hirakata (JP); Hiroki Sakamoto, Hirakata (JP); Ryoji Matsushita, Hirakata (JP)

(73) Assignees: Central Research Institute of Electric Power Industry, Tokyo (JP); Kansai Electric Power Co., Inc., Osaka (JP); Tokyo Electric Power Co., Inc., Tokyo (JP); Nippon Katan Co., Ltd., Osaka (JP)

( * ) Notice: Subject to any disclaimer, the term of this patent is extended or adjusted under 35 U.S.C. 154(b) by 462 days.

(21) Appl. No.: 10/488,926

(22) PCT Filed: Sep. 13, 2002

(86) PCT No.: PCT/JP02/09418

§ 371 (c)(1),
(2), (4) Date: Jan. 28, 2005

(87) PCT Pub. No.: WO03/030319

PCT Pub. Date: Apr. 10, 2003

(65) Prior Publication Data

US 2006/0213872 A1 Sep. 28, 2006

(30) Foreign Application Priority Data

Sep. 17, 2001 (JP) ............................. 2001-281747
Sep. 17, 2001 (JP) ............................. 2001-281748
Sep. 17, 2001 (JP) ............................. 2001-281749

(51) Int. Cl.
*H02H 9/00* (2006.01)

(52) U.S. Cl. ...................................................... 361/137

(58) Field of Classification Search ................. 361/137
See application file for complete search history.

(56) References Cited

U.S. PATENT DOCUMENTS 3,688,061 A * 8/1972 Kane et al. ................... 218/69
4,725,917 A * 2/1988 Mori et al. ................. 361/132
4,736,272 A * 4/1988 Kato et al. .................. 361/138

FOREIGN PATENT DOCUMENTS

| | | |
|---|---|---|
| JP | 61-4988 | 2/1986 |
| JP | 104503/1986 | 7/1986 |
| JP | 61-208766 | 9/1986 |
| JP | 8-321372 | 12/1996 |
| JP | 2001-102149 | 4/2001 |

* cited by examiner

*Primary Examiner*—Stephen W. Jackson
(74) *Attorney, Agent, or Firm*—Edwards Angell Palmer & Dodge LLP

(57) ABSTRACT

An object of the present invention is to provide an arcing horn system having a highly efficient dynamic current shutoff property including a dynamic current shutoff capability, for example, enough for the short circuit fault and other object thereof is to provide an arcing horn system capable of repeatedly maintaining the good dynamic current shutoff capability.

24 Claims, 26 Drawing Sheets

ARCING HORN DEVICE

BACKGROUND OF THE INVENTION

1. Field of the Invention

The present invention relates to an arcing horn system to be annexed to an insulator set or the like for supporting an overhead power transmission line.

2. Description of the Related Art

The above mentioned insulator set is described in, for example, Japanese Patent Laid-open Publication Heisei No. 8-321372. In this publication, as shown in FIG. 20, a structure is provided such that a electric line 72 is suspended from a steel tower (not illustrated) through a sequential suspension type insulator set 71 to be supported. In this case, an arcing horn system is constructed in such a manner that a ground side arcing horn 73 as sort of an iron bar and a electric line side arcing horn 74 are disposed as being opposed with each other at the opposite sides interposing the insulator set 71 therebetween. Then, this arcing horn system is disposed at the right and left sides of the insulator set 71. Alternatively, front end sides of the ground side arcing horn 73 and front end sides of the electric line side arcing horn 74 are formed as being inflected downward and upward, respectively.

At each of front end sides of the ground side arcing horn 73, for example, an insulative tube 75 made of a vinyl chloride is disposed. As shown in FIG. 21, this insulative tube 75 is consisted of an inner layer 75*a* and an outer layer 75*b*. Then, the insulative tubes 75 are secured to this arcing horn 73 as surrounding the front end sides of the arcing horn 73 and an air vent 76 opening to a lower end face of this insulative tube 75 is formed at the lower part of this arcing horn 73. Alternatively, a middle electrode 77 consisted of a conductive member is embedded in the lower end side of the insulative tubes 75 in a radial direction as facing its inner end to the above mentioned air vent 76. Additionally, a cap 78 covering the above mentioned air vent 76 is attached to the lower end of the insulative tube 75.

On the time of thunder stroke, a flashover path running into the electric line side arcing horn 74 from the front end of the ground side arcing horn 73 via the air vent 76 and the middle electrode 77 is formed. Hence, the insulator set 71 is protected. Further, in this case, the inner surface of the air vent 76 is solved to be damaged by the arc due to thunder stroke, so that cracked gas is generated. Additionally, the air within the insulative tubes 75 is heated by the arc or the like, so that the inner pressure thereof is rapidly increased. As a result, the high pressure gas is injected in jet together with the arc through the air vent 76 and due to a cooling and diffusion behavior or the like of this high pressure gas (hereinafter, referred to as arc jet), for example, it is possible to shutoff the dynamic current of the earth fault at the overhead power transmission line for 77 kV almost in a moment of time.

By the way, the accident current of the above mentioned earth fault is several hundred A (Amperes) while the accident current of the short circuit fault is not less than 1,000 A. With respect to such large amount of electric current, even the above described arcing horn system such that the insulative tubes 75 is disposed at the ground side arcing horn 73 may not be able to shutoff the dynamic current. Therefore, an arcing horn system having a dynamic current shutoff capability upon the short cut fault has been demanded.

Alternatively, the above mentioned cap 78 is blown off by the above mentioned arc jet to drop off. Hence, it is possible to easily confirm whether or not the above described operation is generated after the accident. Then, even if the operation is generated once and the cap 78 drops off, at the subsequent thunder stroke, the outburst of the ark jet is generated substantially in the same way as the above, so that the dynamic current is repeatedly shutoff.

If the above mentioned insulative tube 75 is disposed at the electric line side arcing horn 74, the dynamic current shutoff capability is further improved. Therefore, for example, it is possible to provide an arcing horn system having the enough dynamic current shutoff capability for the short circuit fault in addition to the earth fault upon the thunder stroke. However, in this case, only if the insulative tube 75 as same as the above described one is disposed at the front end of the electric line side arcing horn 74, the above mentioned air vent 76 is opened upward, so that after the cap 78 is dropped off at the first thunder stroke, rain water enters in the air vent 76 and water is apt to remain. Then, if the water remains in the air vent 76 in this way, the flashover property is extremely decreased and it becomes difficult to generate the arc. Therefore, it becomes difficult to obtain the sufficient dynamic current shutoff capability.

SUMMARY OF THE INVENTION

The present invention has been made taking the foregoing problems into consideration and an object of which is to provide an arcing horn system having a highly efficient dynamic current shutoff property including a dynamic current shutoff capability, for example, enough for the short circuit fault. Further, other object of the present invention is to provide an arcing horn system capable of repeatedly maintaining the good dynamic current shutoff capability.

Therefore, an arcing horn system according to a first invention is characterized in that an insulative tube 21 for surrounding a front end side of an arcing horn 11, 12 is provided and an air vent 21*a* communicating from a front end portion of the arcing horn 11, 12 to a front end surface of the insulative tube 21 is formed on the insulative tube 21, so that the arc jet is blown off from the air vent 21*a* upon the flashover in accordance with the thunder stroke, wherein the insulative tube 21 is made of a polyamide resin.

According to the above described arcing horn system according to the first invention, in the case that the insulative tubes 21 are made of a polyamide resin, particularly, the mechanical property is more excellent than, for example, a vinyl chloride, so that even if the pressure of the air vent upon the blowoff of the arc jet is higher, it is possible to prevent this insulative tubes 21 from being broken down. Hence, it is possible to realize the arcing horn system capable of shutting off the large amount of dynamic current.

Among the polyamide resin, particularly, a monomer-cast nylon has a good mechanical strength and it is possible to obtain more homogeneous molded article. Therefore, as a second invention, by making the insulative tubes 21 of the monomer-cast nylon, it is possible to realize the arcing horn system capable of more certainly shutting off the large amount of dynamic current.

In the first invention or the second invention, an arcing horn system according to a third invention is characterized in that, when a hole diameter of the air vent 21*a* is defined as d (mm) and the maximum accident current to be shutoff is defined as Ir (A), they are characterized by $d \geqq Ir/2500+2$.

According to the horn system according to the third invention, by setting the hole diameter d of the air vent 21*a* in this way, it is possible to prevent the excessive rise in pressure in the air vent 21*a* from being generated upon the blowoff of the arc jet. As a result, it is possible to obtain more compact arcing horn system capable of certainly shutting off the dynamic current without generating the breakdown, for example, compared to a case of intending to prevent the breakdown by increasing the wall thickness of the insulative tube 21, i.e., the outer diameter thereof.

In the first invention or the second invention or the third invention, an arcing horn system according to a fourth invention is characterized in that, when a hole diameter of the air vent 21*a* is defined as d, a length is defined as L and the maximum accident current to be shutoff is defined as Ir (A), they are set as $d/L \leqq (9\times10^{-6})\cdot Ir+0.07$.

In other words, if d/L is excessively large, the rise in pressure within the air vent 21*a* is repressed too much, so that the blowoff speed of the arc jet is lowered and the blowoff effect of the arc is not capable of being obtained sufficiently. Therefore, according to a fourth invention, by setting d and L in the above described range, in the case that the dynamic current corresponding to the maximum accident current Ir (A), it is possible to certainly shutoff this current.

Further, as a fifth invention, if d and L are set within a range of $d/L \leqq 0.07$, it is possible to realize the arcing horn system capable of shutting off the dynamic current corresponding to the arbitrary current value not more than the maximum accident current Ir (A).

An arcing horn system according to a sixth invention is characterized in that an area, of which outer diameter is smaller than that of a base end side, is provided at the front end side of the insulative tube 21, an insulative tube 21 is formed in this area and a front end portion of the arcing horn is placed in a large diameter area 21*b* at a base end side in the insulative tube 21, so that the insulative tube 21 is attached to the arcing horn 11, 12.

According to the sixth invention, it is possible to realize the compact arcing horn system having a desired breakdown. In other words, the rise in pressure and temperature when the arc jet is generated is highest in a base end area of the air vent 21*a* facing to the front end of the arcing horn, so that the breakdown may be generated from this point as a crack. Therefore, if the wall thickness (the outer diameter) thereof is set so as to have the enough breakdown strength in this area, it is possible to make the wall thickness of the front end side smaller than that of this area. Hence, it is possible to realize the more compact and light arcing horn system having a good shutoff capability.

An arcing horn system according to a seventh invention is characterized in that a male thread 20*a* is formed at an outer periphery at a front end side of the arcing horn 11, 12 and this male thread 20*a* is screwed into the further base end side than the air valve 21*a* in the insulative tube 21, so that the insulative tube 21 is attached to the arcing horn 11, 12.

According to the arcing horn system according to the seventh invention, upon fixing the insulative tubes 21 at the front end sides of the arcing horn, the assembly is carried out so that the thermal adverse effect is not given to these insulative tubes 21. Accordingly, the property of the polyamide resin composing the insulative tubes 21, particularly, the excellent property of the monomer-cast nylon is not damaged, so that the lowering of the breakdown strength is repressed and it is possible to realize the arcing horn system as the dynamic current shutoff system. Alternatively, upon blowoff of the arc jet, when the high pressure is generated in the air vent 21*a*, it is feared that the insulative tubes 21 drop off the arcing horn. However, it is possible to prevent suchlike dropping off more certainly by the above described screw conjunction.

An arcing horn system according to an eighth invention is characterized in that an outer peripheral surface of the insulative tube 21 is coated with a coating layer 22 and crimp portions 22*a* to 22*c* are integrally formed on this coating layer 22 as extending in a just about disc form.

According to the arcing horn system according to the eighth invention, when the coating layer 22 having crimp portions 22*a* to 22*c* is disposed at the outer periphery of the insulative tube 21, the creepage distance for insulation in the axial direction becomes longer. Hence, the arc transition is repressed such that an electrode point of the arc moves from the front end of the arcing horn to the base end side of the arcing horn across the insulative tube 21. Alternatively, as a ninth invention, when the coating layer 22 is made of an insulative material that is softer than the insulative tube 21, even if the insulative tube 21 is broken down, it is possible to prevent the flying dropping thereof.

An arcing horn system according to a tenth intention is characterized in that the plural crimp portions 22*a* to 22*c* are disposed along an axial center direction of the insulative tube 21 and a diameter of the crimp portion 22*b*, 22*c* at the base end side is smaller than that of the crimp portion 22*a* at the furthest front end.

The arcing horn according to the tenth invention is particularly effective when the insulative tubes 21 are disposed at the front end sides of respective arcing horns 11 and 12 at the ground side and the electric line side, respectively. In other words, in the blown off arc jet, a conductive component such as a metal component which is generated when the front ends of the arcing horns 11 and 12 are melted to be vaporized and an ionic component in the plasma gas or the like is contained. Under the condition that suchlike component is floating in the air, the insulating proof strength in the air is decreased, so that the arc transition is easily generated. Therefore, the crimp portion 22*a* at the furthest front end is added with a function to repress that the arc jet to be blown off from the opposing insulative tube 21 moves backward so that its external measurement is set. On the other hand, it is not needed to provide the above described function to the crimp portions 22*b* and 22*c* at the base end side, so that the diameters of the crimp portions 22*b* and 22*c* are made smaller than the crimp portion 22*a* at the furthest front end. Hence, it is possible to realize the arcing horn system which is light and compact entirely. Additionally, since the depth of a fallen space between respective crimp portions 22*a* to 22*c* is more shallow, even if the conductive component moves backward across the crimp portion 22*a* at the furthest front end, this conductive component quickly flows away from a plurality of areas where the crimp portions are formed. Accordingly, this enables to recover the insulative force of the environmental atmosphere of the insulative tube more quickly so that the dynamic shutoff capability has been improved.

An arcing horn system according to an eleventh invention comprising a ground side arcing horn 11 and a electric line side arcing horn 12 to be attached to the opposite sides of an insulator set 1 as being opposed with each other is characterized in that insulative members 13 and 14 are provided at respective front end sides of the ground side arcing horn 11 and the electric line side arcing horn 12, respectively and air vents 21*a* are formed on these insulative members 13 and 14 as communicating from the front ends of the arcing horns 11 and 12 to the front end surfaces of the insulative members 13 and 14; and the arc jet is blown off from respective air vents 21*a* when the arc is generated between the front ends of both arcing horns 11 and 12 upon the thunder stroke.

According to the arcing horn according to the eleventh invention, when the insulative members 13 and 14 are disposed at the both of the ground side and the electric line side, respectively, and the dynamic current shutoff effect due to the arc jet is generated at the both of the ground side and the electric line side, for example, in addition to the dynamic current upon the earth fault accident, it is possible to realize the arcing horn system having the high dynamic shutoff property so that the shutoff of the dynamic current upon the short circuit accident is capable of being quickly shutoff.

An arcing horn system according to a twelfth invention is characterized in that the respective insulative members 13 and 14 are provided so that center lines of the respective air vents 21*a* are placed at a blunt angle, so that the arc jets to be blown off through respective air vents 21*a* are criss-crossed with each other.

According to the arcing horn according to the twelfth invention, interaction between the arc jet blown off from respective air vents 21*a* is generated so that the arc jet blown off from respective air vents 21*a* are flown away from the area between the opening ends of respective air vents 21*a* to the side direction, so that the constitutional component of the arc jet is not flown and not remain in the above mentioned area and respective insulative members 13 and 14. In other words, in the arc jet, in the arc jet, in the blown off arc jet, a conductive component such as a metal component which is generated when the front ends of the arcing horns 11 and 12 are melted to be vaporized and an ionic component in the plasma gas or the like is contained. Under the condition that suchlike component is floating in the air, the insulating proof strength in the air is decreased. However, according to the above described constitution, a condition is not generated such that suchlike conductive component is floating between respective insulative members 13 and 14 and around thereof. Hence, it is possible to quickly recover the insulative force in the air. As a result, it is possible to realize the arcing horn system provided with the highly efficient dynamic current shutoff property.

In this case, even in the case that the center lines of the above mentioned respective air vents 21*a* are placed at a blunt angle, when respective air vents 21*a* are placed substantially on the same axis, the sufficient flying effect to the side directions of the above described arc jet with each other is not capable of being obtained. Therefore, as a thirteenth invention, it is desirable to place the air vents 21*a* such that the opening angle between the center lines of respective air vents 21*a* is not more than 130 degrees. In this way, by setting the opening angle not more than 130 degrees, it is possible to certainly obtain the flying effect to the side directions of the above described arc jet with each other.

On the other hand, if the opening angle is made smaller to approach the parallel arrangement too much, the flashover path between respective front ends of the both arcing horns 11 and 12 is changed so that it does not go through the opening end of the air vent 21*a* but it penetrates the side wall around the air vent 21*a* in respective insulative members 13 and 14, so that it is feared that these insulative members 13 and 14 are broken down. In order to prevent this, for example, by increasing the thickness of the side wall, it is needed to make the side wall thicker and the insulation resistance along this thickness direction is made larger or the like and this makes the entire size of the acing horn system larger. Therefore, it is desirable to make the opening angle between the center lines of respective air vents 21*a* not less than 100 degrees as a fourteenth invention. Hence, the flashover path via the opening ends of respective air vents 21*a* is secured and the breakdown of the insulation members 13 and 14 is capable of being prevented, so that it is possible to realize the more compact acing horn system.

An arcing horn system according to a fifteenth invention is characterized in that at least one of the ground side arcing horn 11 in a bar and the electric line side arcing horn 12 in a bar is formed in such a manner that a base end portion 11*a*, 12*a* of which one end side is fixed to the insulator set 1, a middle portion 11*b*, 12*b* and a front end portion 11*c*, 12*c* to which the insulative member 13, 14 is attached as placing the air vent 21*a* on the same axis are sequentially continued; and a connection place of the base end portion 11*a*, 12*a* and the middle portion 11*b*, 12*b* and a connection place of the middle portion 11*b*, 12*b* and the front end portion 11*c*, 12*c* are inflected, respectively, so that the center line of the air vent 21*a* and the center line of the base end portion 11*a*, 12*a* are not placed on the same plane.

For example, as a sixteenth invention, a connection place of the base end portion 11*a*, 12*a* and the middle portion 11*b*, 12*b* are inflected so that the base end portion 11*a*, 12*a* and the middle portion 11*b*, 12*b* are continued substantially in a L-shape; and a connection place of the middle portion 11*b*, 12*b* and the front end portion 11*c*, 12*c* are inflected in a different direction from the inflecting direction at the connection place of the base end portion 11*a*, 12*a* and the middle portion 11*b*, 12*b* so that these middle portion 11*b*, 12*b* and front end portion 11*c*, 12*c* are continued substantially in a nearly V-shape.

According to the arcing horn systems according to the fifteenth and sixteenth inventions, a reaction force F when the arc jet is blown off from the air vents 21*a* particularly acts as a bending moment upon the base end portions 11*a* and 12*a* through the front end portions 11*c* and 12*c* and the middle portions 11*b* and 12*b* and simultaneously, it also acts as a twisting moment around the axial center. In other words, the operation direction of the above mentioned reaction force F is opposite to the blowoff direction of the arc jet along the center line of the air vent 21*a* and this operation direction is not placed on the same level, namely, respective center lines between the air vents 21*a* and the base end portions 11*a*, 12*a* are not in parallel with each other, these extensions are not cross with each other and they are kept aloof with each other, so that the twisting moment M (=L1•F) that is obtained by multiplying the above mentioned reaction force F on a distance L1 between these two lines acts on the base end portions 11*a* and 12*a*.

As a result, in connection with the blowoff of the arc jet when the arc is generated between the front ends of respective arcing horns 11 and 12, it is possible to make the volume of alteration in a direction in which the front ends of respective arcing horns 11 and 12 are kept aloof with each other larger. In accordance with this, as a result that the arc is extended and the voltages at the opposite ends becomes higher, this arc has disappeared more quickly, so that this improves the dynamic current shutoff capability.

An arcing horn system according to a seventeenth invention is characterized in that an insulative member 14 for surrounding a front end side of an arcing horn 12 and an air vent 21*a* communicating from a front end portion of the arcing horn 12 to a front end surface of the insulative member 14 is formed on the insulative member 14; wherein a cap 30 for covering the front end side of the insulative member 14 is disposed so as to prevent the intrusion of the rain water into the air vent 21*a*; and the cap 30 is provided with opening means for allowing the blowoff of the arc jet through a wall portion 32 on this wall portion 32 that crisscrosses a blowoff path of the arc jet to be blown off from the air vent 21*a* to the front end side upon the flashover by the thunder stroke.

According to the arcing horse system according to the seventeenth invention, the cap 30 to repress the intrusion of the rain water into the air vents 21*a* as covering the front end side of the insulative member 14 is provided with opening means for allowing the blowoff of the arc jet, so that the blowoff condition of the arc jet is not prevented by the cap 30 and further, this cap 30 is not dropped off by the blowoff power of the arc jet. Accordingly, even in the case that this arcing horn system is set so that the air vents 21*a* open upward, the intrusion of the rain water into the air vents 21*a* is continuously prevented. Hence, it is possible to obtain a good dynamic current shutoff capability for each thunder stroke and to repeatedly use this capability.

For example, as an arcing horn system according to an eighteenth invention, it is possible to construct the above described opening means in such a manner that a movable body 36 is disposed on the wall portion 32 of the cap 30, which is capable of displacing between an evacuation position for evacuating the movable body from the blowoff path of the arc jet as being depressed by the blowoff power of the arc jet and a rain water intrusion preventing position for preventing the intrusion of the rain water as being placed on the blowoff path.

In this case, for example, as an arcing horn system according to a nineteenth invention, it is possible to construct the movable body 36 in such a manner that one end side of the movable body 36 is connected to the circumference of the cap 30 and other end side thereof is made of an elastic body that is elastically transformed along the blowoff direction by the blowoff power of the arc jet.

Alternatively, in this case, for example, as an arcing horn system according to a twenty invention, the wall portion 32 of the cap 30 is formed in such a manner that sectioned pieces 32*a* that are sectioned by a plurality of slits 35 adjoin with each other; and these sectioned pieces 32*a* are formed as the movable body 36. Therefore, it is not needed to provide a member for the movable body exclusive use separately, so that the entire constitution of the arcing horn system becomes simple.

On the other hand, as an arcing horn system according to twenty-first invention, it is also possible that a penetration hole 34 is defined on an area on the blowoff path of the arc jet in the wall portion 32 of the cap 30; so that the opening means is formed.

In this case, as an arcing horn system according to twenty-second invention, if a projection 45 projecting to the front end side of the cap 30 is disposed on the wall portion 32 of the cap 30 so that the penetration hole 34 is defined on this projection 45, when the rain water falling on the end surface of the above mentioned wall portion 32 flows on the end surface of this wall portion 32 (i.e., the upper surface), this rain water does not flow into a penetration hole 34 across the upper end surface of a projection 45. Hence, it is possible to certainly repress the intrusion of the rain water into the air vents 21*a*.

In the arcing horn system described in any one of claims 17 to 22, according to an arcing horn system according to a twenty-third invention is characterized in that a space 33 is provided between the wall portion 32 of the cap 30 and he front end surface of the insulative member 14; and a water drain opening 37 is defined on the peripheral wall of the cap surrounding this space 33.

According to such a constitution, even if the rain water intrudes in the above mentioned space 33 in the cap 30, this rain water is discharged to the outside through the water drain opening 37. Accordingly, the rain water does not remain in the above mentioned space 33, so that it is certainly prevented that the water intrudes into the air vents 21*a* and the water remains in these air vents 21*a* and it is possible to maintain the stable dynamic current shutoff capability.

In the arcing horn system described in claim 23, an arcing horn system according to a twenty-fourth invention is characterized in that a projection 46 is provided on the front end surface of the insulative member 14 as projecting forward; and the front end opening portion of this projection 46 is defined as an arc jet blowoff port.

According to the arcing horn system according to the twenty-fourth invention, when the rain water intruded into the cap 30 is flowing on the front end surface of the insulative member 14 in a direction of the water drain opening 37, this rain water does not flow into the air vents 21*a* across the upper end surface of the projecting portion 46, so that it is possible to certainly repress the intrusion of the rain water into the air vents 21*a*.

DESCRIPTION OF THE PREFERRED EMBODIMENTS

Figure 2:
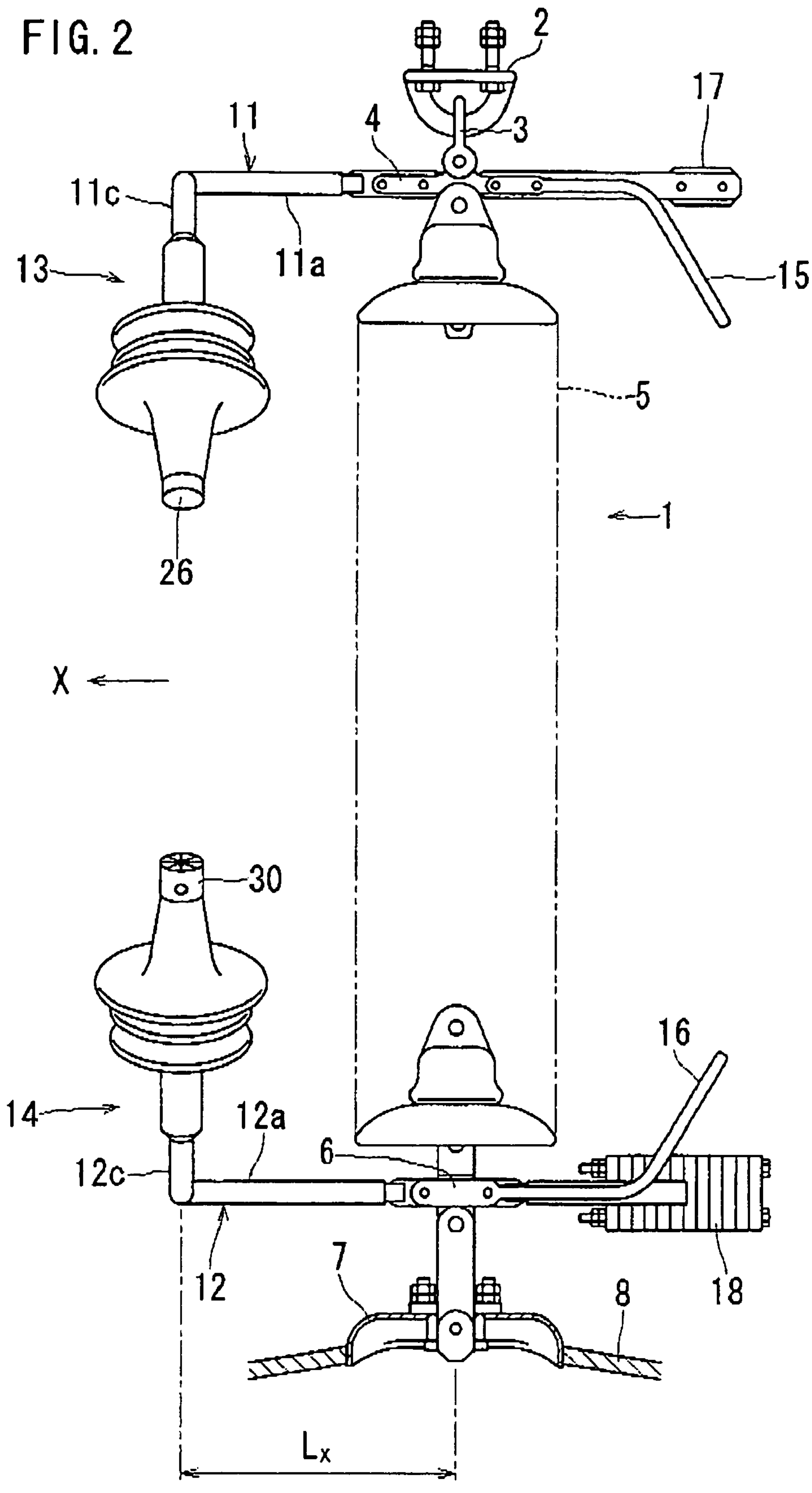
FIG. 2 is a front view for showing an arcing horn system that it annexed to an insulator set.

In the next place, an embodiment according to the present invention will be described in detail with reference to the drawings. FIG. 2 illustrates a sequential suspension type insulator set 1 according to the present embodiment. This insulator set 1 is employed upon supporting an overhead power transmission line for the class of 66 kV to 77 kV by an iron arm (not illustrated). The insulator set 1 is provided with an insulator series 5 which is suspended and supported by a fixing cramp 2 for the iron arm via an U crevice 3 and ground side horn attaching cramp 4. At the lower end portion of this insulator series 5, a electric line side horn attaching cramp 6 and a suspended cramp 7 are sequentially disposed, so that a electric line 8 is fixed and supported by this suspended cramp 7.

At respective horn attaching cramps 4 and 6 at the above mentioned ground side and the electric line side, arcing horns 11 and 12 made of an iron bar, which are extended substantially horizontally to the left side in FIG. 2, respectively, are fixed. Alternatively, the iron tower is placed at the back side of a surface of the drawing. Hereinafter, a direction from the right to the left in the drawing is referred to as an X direction, a direction from the back side of the drawing surface to the front side is referred to as a Y direction and a distance from a center axis of the insulator series 5 in the X direction is referred to as an X coordinate. The ground side arcing horn 11 at the upper side is inflected downward at the place where the X coordinate is Lx and the electric line side arcing horn 12 at the lower side is inflected upward at the same place of the X coordinate as the above, respectively. At the front end sides of these respective inflecting portions, insulative members 13 and 14 to be described later are disposed respectively.

Alternatively, to respective horn attaching cramps 4 and 6, arcing horns 15 and 16 (hereinafter, referred to as a gap horn) made of an iron bar, which are extended to the right side in FIG. 2, respectively, are fixed. Respective front end sides of these gap horns 15 and 16 are also formed as being inflected vertically. Alternatively, balance weights 17 and 18 are attached to respective horn attaching cramps 4 and 6, respectively, so that a distance between respective front ends of the arcing horns 11 and 12 as being opposed vertically and a distance between respective front ends of the gap horns 15 and 16 are maintained by a certain gap measurement.

Figure 3:
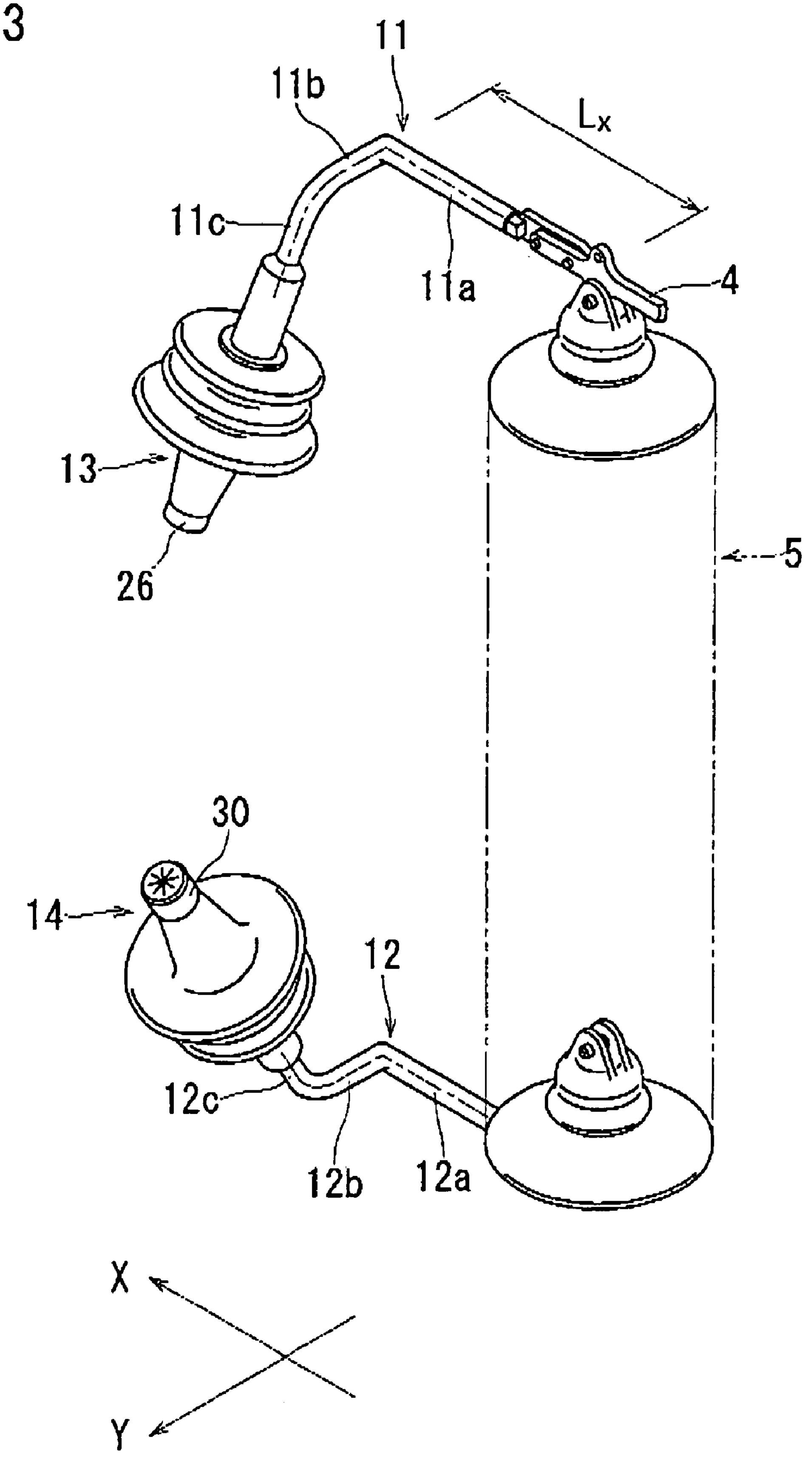
FIG. 3 is a perspective view for showing an arcing horn system that is annexed to an insulator set.
Figure 4:
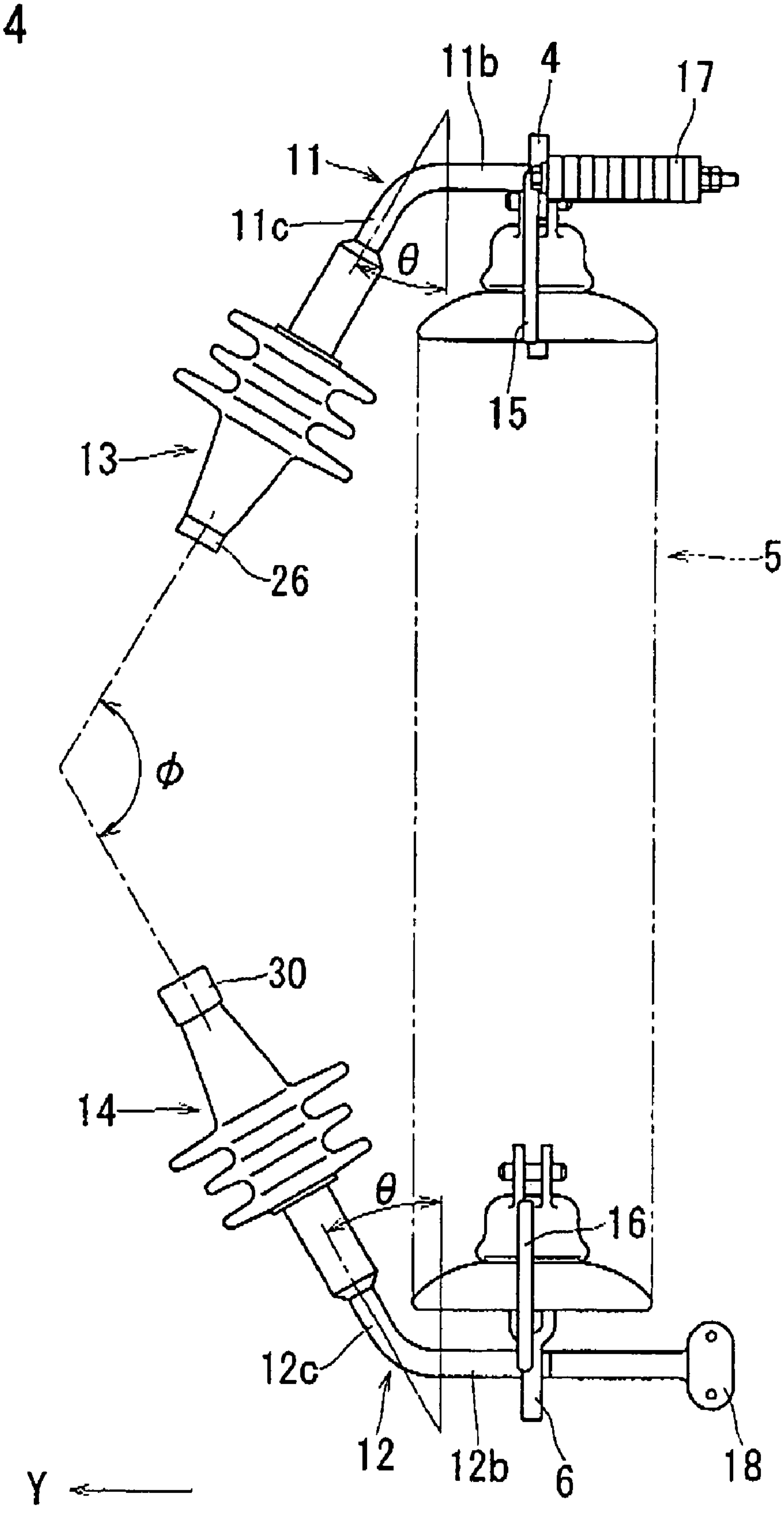
FIG. 4 is a lateral view for showing an arcing horn system that is annexed to the above mentioned insulator set.

As shown in FIG. 3, the ground side and the electric line side arcing horns 11 and 12 are inflected at two places, respectively. Further, the middle portions 11*b* and 12*b* that are extended horizontally along a Y direction and the front end portions 11*c* and 12*c* that are extended vertically from the front ends of these middle portions 11*b* and 12*b* are sequentially continued at the front ends of the base end portions 11*a* and 12*a*, of which base end sides (a right end side in the drawing) are fixed to the above mentioned horn attaching cramps 4 and 6 and which are extended horizontally. In other words, the connection places of these base end portions 11*a* and 12 and the middle portions 11*b* and 12*b* are inflected so that the base end portions 11*a* and 12 and the middle portions 11*b* and 12*b* are continued substantially in a L-shape and the connection places of the middle portions 11*b* and 12*b* and the front end portions 11*c* and 12*c* are inflected differently from the inflected direction of the above described connection places of the base end portions 11*a* and 12 and the middle portions 11*b* and 12*b*, so that these middle portions 11*b* and 12*b* and these front end portions 11*c* and 12*c* are continued substantially in a nearly V-shape. Then, in a vertical plane in which a X coordinate is in parallel with the Y direction at the above mentioned Lx, as shown in FIG. 4, the front end portion 11*c* of the ground side arcing horn 11 is formed so that it is inclined downward in a Y direction from a vertical line at an angle of θ (for example, 30 degrees).

The front end portion 12*c* of the electric line side arcing horn 12 is formed so that it is inclined upward toward the Y direction at the inclined angle of θ as same as above in the above mentioned vertical plane. Alternatively, hereinafter, the angles θ with respect to a vertical line between respective front end portions 11*c* and 12*c* at the ground side and the electric line side are referred to as "the swing angles" and the angles ϕ with respect to between respective center lines of these front end portions 11*c* and 12*c* are referred to as "the opening angles". Alternatively, hereinafter, only a constitution is taken as an example such that the swing angles θ of respective front end portions 11*c* and 12*c* at the ground side and the electric line side are the same with each other. Accordingly, the swing angle θ means the inclined angles of the both of front end portions 11*c* and 12*c* at the ground side below (in this case, the opening angle ϕ=180 degrees−2θ).

At respective front end portions 11*c* and 12*c* that are inclined, respectively, as described above, the above mentioned insulative members 13 and 14 substantially in a circular cylinder are attached on the same axis, respectively. These constitutions are substantially the same except that the vertical directions are different with each other, so that taking the arcing horn 12 side of the lower side (i.e., the electric line side), these constitutions will be explained with reference to FIG. 1 below.

The arcing horn 12 in an iron bar will be explained below as referring a component composing the above mentioned base end portion 12*a*, the middle portion 12*b* and a lower half part of the front end portion 12*c* as an attaching cramp 12A and referring a component composing an upper half part of the front end portion 12*c* and the upper end thereof is formed with a sharp point as a front end cramp 12B.

In the insulative member 14, at the axis center of the insulative tube 21, an air vent 21*a* opening to the upper end surface of this insulative tube 21 is formed substantially in a column. This insulative tube 21 is, for example, made of a hard vinyl chloride, fluoroplastic and a polyamide resin (for example, Nylon 6, Nylon 6-6 and a monomer-cast nylon) or the like and a coating layer 22 made of a soft vinyl chloride is disposed at the outer periphery thereof.

The above mentioned insulative tube 21 is fixed to this front end cramp 12B on the same axis so that it surrounds the upper end side area of the front end cramp 12B of the arcing horn 12. Specifically, a male thread 20*a* of the front end cramp 12B is formed. Further, by screwing this male thread 20*a* into the insulative tube 21 till the upper end of the front end cramp 12B reaches to the above mentioned air valve 21*a*, this insulative tube 21 is fixed to a front end cramp 12B.

The insulative tube 21 is formed in a taper shape such that the part from a substantially middle position in a length direction to the lower side (the base end side) is shaped in a column and a diameter of the upper part thereof becomes gradually smaller toward the front end surface. Hereinafter, the insulative tube 21 may be explained as referring the column shaped area at the base end side as a large diameter area 21*b* and referring the taper area as a small diameter area 21*c*. At the upper end portion of the small diameter area 21*c*, a cap 30 for preventing the intrusion of the rain water to be described later is attached. On the other hand, the axial measurements of the above mentioned front end cramp 12B and the large diameter area 21*b* are set so that the front end of the above mentioned arcing horn 12 is placed within the above mentioned large diameter area 21*b* and thus, this insulative tube 21 is attached to the front end cramp 12B.

On a coated layer 22, a plurality (in the drawing, three layers thereof) of the crimp portions 22*a* to 22*c* projecting to the outside in a disc form, respectively, is provided substantially at even intervals along the axial center direction of the insulative tube 21 in an area surrounding the above mentioned large diameter area 21*b*. In this case, the crimp portions 22*b* and 22*c* at the lower side are formed as the outer measurement is smaller than that of the crimp portion 22*a* at the furthest front end. These coated layer 22 and the insulative tube 21 are molded individually as respective inner and outer peripheral surfaces are made the same shapes and then, the insulative tube 21 is inserted into the coated layer 22 and they are fixed with each other by a method for bonding them with adhesive. Hence, the thermal adverse effect is not given to the insulative tube 21, so that the coated layer 22 and the insulative tube 21 are assembled without deterioration of the property of the above mentioned polyamide resin composing the insulative tube 21.

At the outer periphery of the connection places of an attaching cramp 12A and the front end cramp 12B in the arcing horn 12 at the lower side of the insulative tube 21, a tubular insulation cover 24 made of a soft vinyl chloride is provided.

Figure 5A:
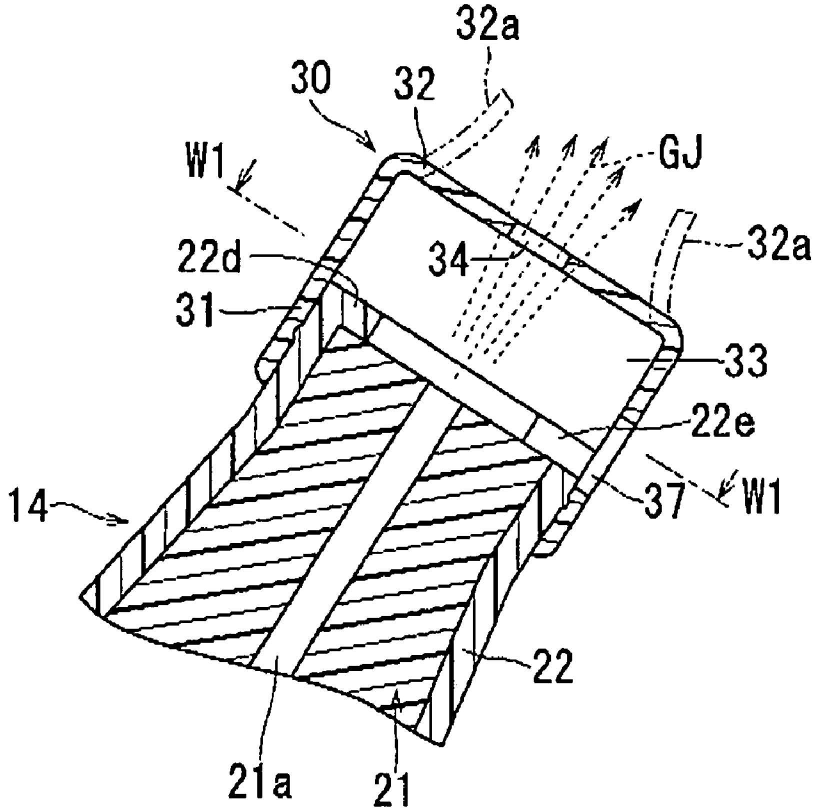
FIG. 5A is longitudinal sectional view for showing a cap that is attached to a front end of the above mentioned arcing horn system.

As shown in FIG. 5A, the above mentioned cap 30 is made in a reversed U cross section having a circular cylinder portion 31 and a wall portion 32 for filling in the upper end of this circular cylinder portion 31, for example, by using the soft vinyl chloride. By bonding the lower end side of the circular cylinder portion 31 with the upper end outer periphery of the insulative member 14 with the adhesive, this cap 30 is attached to the insulative member 14 as a space 33 is defined between the wall portion 32 and the insulative member 14.

Figure 5B:
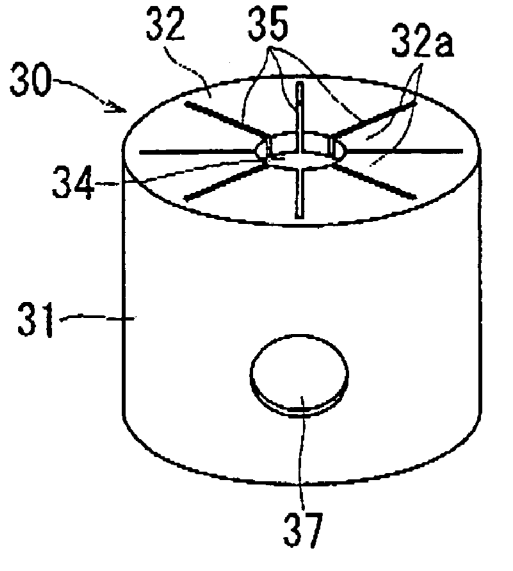
FIG. 5B is a perspective view for showing a cap that is attached to a front end of the above mentioned arcing horn system.
Figure 5C:
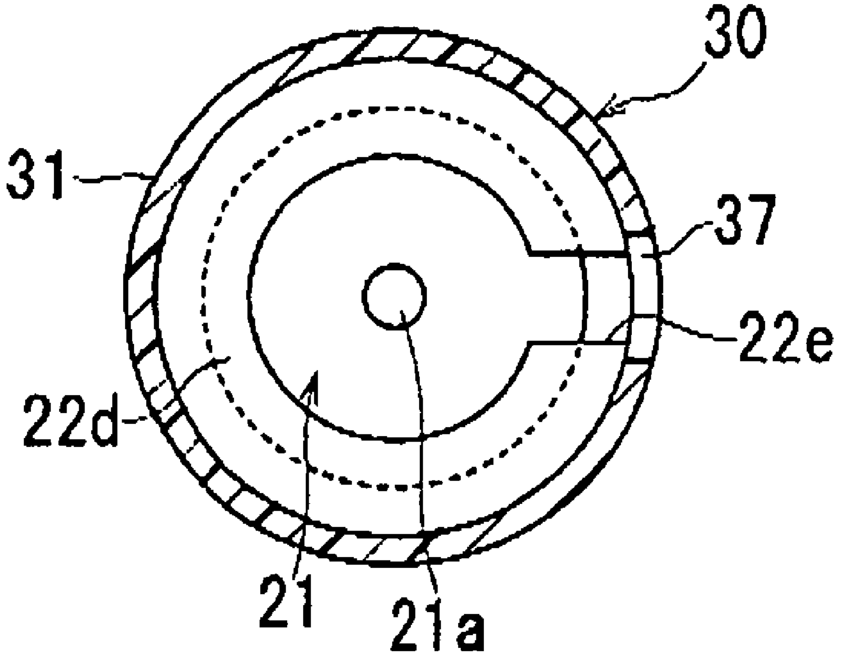
FIG. 5C is a cross sectional view cut by a line of W1-W1 arrowhead shown in FIG. 5A.

At the center of the wall portion 32, the penetration hole 34 of which diameter is larger than that of this air vent 21*a* to some extent is formed on the same level as the above mentioned air vent 21*a*. Alternatively, as shown in FIG. 5B, a plurality of slits 35 is disposed in a radial pattern from the circumference of the penetration hole 34 to the outer diameter on this wall portion 32 and sectioned pieces 32*a* that are sectioned by the slits 35 adjoin with each other to cover the wall portion 32 except for its outer periphery side. On the other hand, at the lower end side of the circular cylinder portion 31, the water drain opening 37 penetrating this circular cylinder portion 31 is defined. Alternatively, at the upper end of the coated layer 22 in the insulative member 14, a circle coated portion 22*d* is continued to cover the outer peripheral side of the upper end surface of the insulative tube 21. However, as shown in FIG. 5B and FIG. 5C, an area adjoining to the above described water drain opening 37 is partially cut out, so that a drainage groove portion 22*e* is formed in communication with the water drain opening 37.

Due to the above mentioned cap 30, the intrusion of the rain water into the air vent 21*a* is prevented, so that the deterioration of the flash over property through this air vent 21*a*, namely, a fact that it is difficult for the arcing to be generated is capable of being repressed. In other words, the rain water falling from the above is received at the end surface (i.e., the front end surface) of the wall portion 32 of the cap 30 and the most part thereof flows down on the end surface (i.e., the upper surface) of this wall portion 32. Alternatively, the rain water that has intruded into the interior of the cap 30 through the penetration hole 34 is received at the front end surface of the insulative tube 21 and then, it flows on this front end surface in a direction of the water drain opening 37. Hence, the rain water remains within the cap 30. Further, it is repressed that the rain water intrudes in the air vent 21*a* and the rain water remains within this air vent 21*a*, so that it is possible to prevent the deterioration of the flash over property through the air vent 21*a*.

On the other hand, as described in detail, the arc jet is blown off from the air vent 21*a* upon thunder stroke. In this case, as shown by a double dashed line in FIG. 5A, the above mentioned respective sectioned pieces 32*a* are pressed by the blowoff power of the arc jet GJ to be elastically inflected upward, so that the opening area thereof is widened. Hence, the blowoff condition of the arc jet GJ is hardly inhibited by this cap 30, so that the dynamic current shutoff capability to be described later is effected.

The insulative member 13 which is attached to the front end side of the above mentioned ground side arcing horn 11 shown in FIG. 2 is constructed substantially same as the above in such a manner that respective front end portions of this ground side arcing horn 11 and the electric line side arcing horn 12 are placed substantially on the same vertical level with each other and the opening end of the above mentioned air vents 21*a* in respective insulative members 13 and 14 are also placed substantially on the same vertical level to be opposed with each other vertically.

Alternatively, since it is not feared that the rain water intrudes into the above mentioned air vent 21*a* in the insulative member 13 of the ground side (i.e., the upper side), at the lower end portion, an operation indication cap 26 made of the soft vinyl chloride is attached detachably as its center is only provided with a needle hole. This cap 26 is flown off by the arc jet to be blown off from this insulative member 13 upon thunder stroke to drop down. Hence, the cap 26 functions as an indicator for confirming whether or not the above described operation is generated after the operation.

A distance (i.e., the discharge gap in the air) between respective front ends of the above-described constituted ground side and the electric line side arcing horns 11 and 12 is shorter set than the distance between respective front ends of the above mentioned gap horns 15 and 16. Accordingly, upon thunder stroke, at first, between the both arcing horns 11 and 12, more specifically, between the front ends of respective arcing horns 11 and 12 through respective air vents 21*a* in the insulative members 13 and 14, a flashover path is formed.

In this case, the separation gas is generated when the inner surface of the air vent 21*a* is melted and damaged by the arcing due to the thunder stroke. Additionally, the air in the air vent 21*a* is heated by the arcing or the like, so that the inner pressure is rapidly increased. Hence, the high pressure gas is blown off from the opening end in jet together with the arcing. Due to the pressure effect and the diffusion effect of this high pressure gas (hereinafter, referred to as the arc jet), the arcing length is increased. Additionally, due to the cooling effect, the arcing resistance is increased. On the other hand, the interiors of the insulative members 13 and 14 are substantially evacuated and the insulating proof strength within the air vent 21*a* is increased. As a result, the dynamic current after the flashover is shutoff in a moment of time. As a result that the dynamic current shutoff effect due to suchlike arc jet is generated at the both of the ground side and the electric line side, in addition to the dynamic current upon the earth fault, it is possible that the shutoff of the dynamic current upon the short circuit fault is also quickly performed.

Particularly, according to the present embodiment, in order to allow the shutoff of the short circuit type dynamic current of which accident current exceeds, for example, 5 kA, the insulative tubes 21 of respective insulative members 13 and 14 are made of a polyamide resin. A reason why such a material is selected will be described below.

A table 1 shows an example of a result that the material of the insulative tubes 21 is changed variously and the dynamic current shutoff experiment is carried out. In this table 1, a case that a material of the insulative tubes 21 is a soft vinyl chloride as same as the conventional one, a case that it is a fluoroplastic and a case that it is a monomer-cast nylon as a sort of a polyamide resin are cited. In the table 1, respective tests are carried out under the condition that the insulative tube 21 with the hole diameter d of the air vent 21*a* of 6 mm and the length L of 104 mm is manufactured in a shape shown in FIG. 1. Additionally, the monomer-cast nylon (hereinafter, referred to as MCN) is manufactured by applying a monomer cast molding method to a polyamide 6 (i.e., nylon 6). By utilizing the fact that the melted ϵ-caprolactam rapidly is polymerized by an alkali metal, a catalyst and a stabilizer are quickly and evenly mixed with a fused monomer in he inactive gas and then, they are poured into a mold, so that the monomer-cast nylon is polymerized to be manufactured in the mold. This monomer-cast nylon is even to the inside thereof and it has no air bubble and the unreacting monomer amount is low and there is no distortion, so that it is characterized by various physical properties and a good measure stability.

TABLE 1

| | Material | | |
|---|---|---|---|
| Test current (kA) | Vinyl chloride | Fluorocarbon resin | Monomer-cast nylon |
| 3 | X | ○ | ○ |
| 4 | — | ○ | ○ |
| 5 | — | ○ | ○ |
| 6 | — | ○ | — |
| 7 | — | X | ○ |
| 8 | — | — | ○ |
| 9 | — | — | — |
| 10 | — | — | X |

○: Successful in shutoff
X: Fails in shutoff due to breakdown

As shown in the table 1, in the insulative tube 21 that is made of a vinyl chloride, in the case that the test current is defined as 3 kA, the insulative tube 21 is broken down and the dynamic current is not shutoff. On the contrary, when the insulative tube 21 is made of fluoroplastic, the dynamic current shutoff is available till the test current of 6 kA and when the insulative tube 21 is made of MCN, the dynamic current shutoff is available till the test current of 8 kA. Alternatively, after the dynamic current shutoff test, the insulating strength of the front end portion is measured (namely, applying a voltage between the front end of the arcing horn and the air vent, the voltage when the insulating breakdown occurs is measured). As a result, the insulating strength is hardly lowered when the insulative tube 21 is made of a vinyl chloride and MCN. On the contrary, in the insulative tube 21 that is made of fluoroplastic, the insulating strength is extremely lowered. Hence, this results in that the insulative tube 21 that is made of fluoroplastic is not capable of being used repeatedly.

From the above described points, in the case of realizing an arcing horn system to shutoff a larger current, as a material of the insulative tube 21, MCN is optimum. In other words, in the case that the arc jet is blown off through the air vent 21*a* upon the flashover and thereby, the dynamic current is shutoff, at first, it is necessary that a gas component contained in the arc jet has arc extinguishing capability no less than that of a conventional vinyl chloride in accordance with the material. Further, in order to cope with the larger accident current, the insulating proof strength is required since the pressure in the air vent becomes very high in association with the increase of the arc energy. The MCN is most suitable for these requirements. Therefore, if the insulative tube 21 is made of this MCN, it is possible to realize the arcing horn system capable of shutting off the larger current.

Incidentally, in a table 2, general mechanical properties with respect to a soft vinyl chloride, fluoroplastic and Nylon 6 are shown and in a table 3, an example of a result of a test is shown such that the Nylon 6 (an injection molded article) and MCN are pulled in fact.

TABLE 2

| Material | Pulling Strength (MPa) | Compression Strength (MPa) | Inflecting Strength (MPa) | Expansion (%) | Main Contained element |
|---|---|---|---|---|---|
| Vinyl chloride | 41–52 | 55–89 | 69–110 | 10–80 | Cl(C,H) |
| Fluoro-carbon resin | 27–34 | 55–59 | 34–62 | 200–400 | F(C) |
| Nylon 6 | 75–96 | 92–95 | 96–110 | 10–50 | H(C,O,N) |

TABLE 3

| | Pulling strength (MPa) | | Expansion (%) | |
|---|---|---|---|---|
| Material | Lengthwise direction | Lateral direction | Lengthwise direction | Lateral direction |
| Nylon 6 | 75.0 | 67.4 | 39.4 | 37.4 |
| MCN | 89.6 | 87.7 | 43.1 | 42.2 |

Further, a polyamide resin other than MCN and Nylon 6, for example, Nylon 6-6 and Nylon 6-10 or the like have the same constitutional elements and the mechanical properties thereof are inferior to that of MCN but are substantially the same as that of the above mentioned Nylon 6. Therefore, if the insulative tube is manufactured by selecting these materials, it is possible to realize the arcing horn system capable of shutting off the larger current, for example, compared to the insulative tube made of a soft vinyl chloride.

However, a shape of the above mentioned air vent 21*a* to be disposed in the insulative tube 21 acts on the dynamic current shutoff capability very much. For example, as the hole diameter becomes larger, the rise of the pressure within the air vent 21*a* is repressed lower. In this case, the blowoff rate of the arc jet becomes lower, so that it is considered that the drawing out effect of the arc or the like becomes weak and the shutoff capability is lowered. Additionally, even if the hole diameters are the same, as the length thereof is shorter, a degree of the rise of the pressure becomes smaller. This also influences the shutoff capability.

Figure 6A:
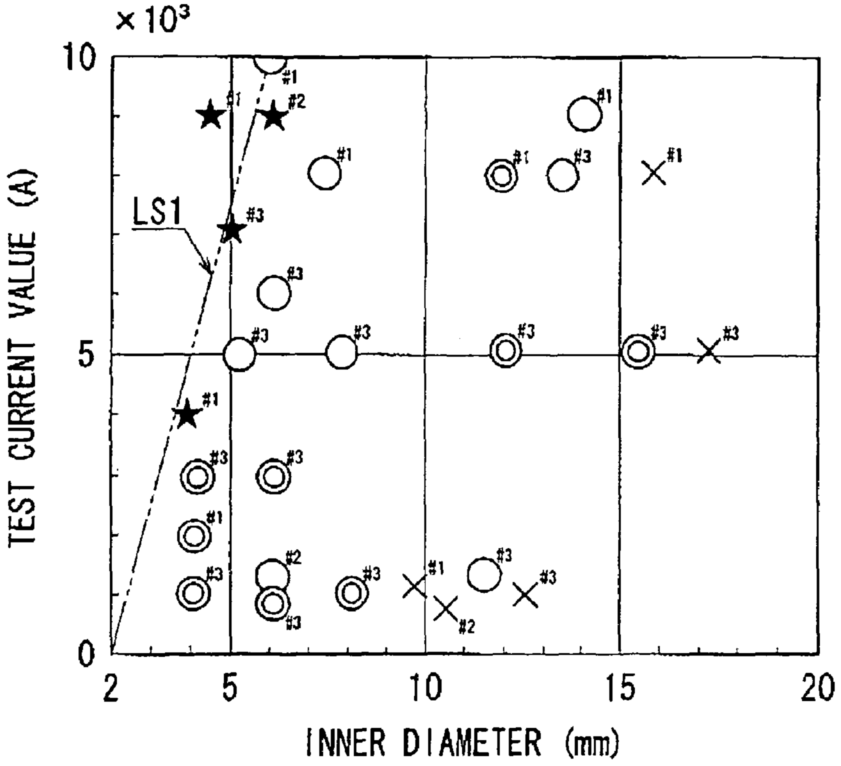
FIG. 6A is a graph for showing whether or not the dynamic current is shutoff when an inner diameter of an air vent at the front end side of the arcing horn system and a test electric current value are variously changed and illustrates a result of a dynamic current shutoff experiment.
Figure 6B:
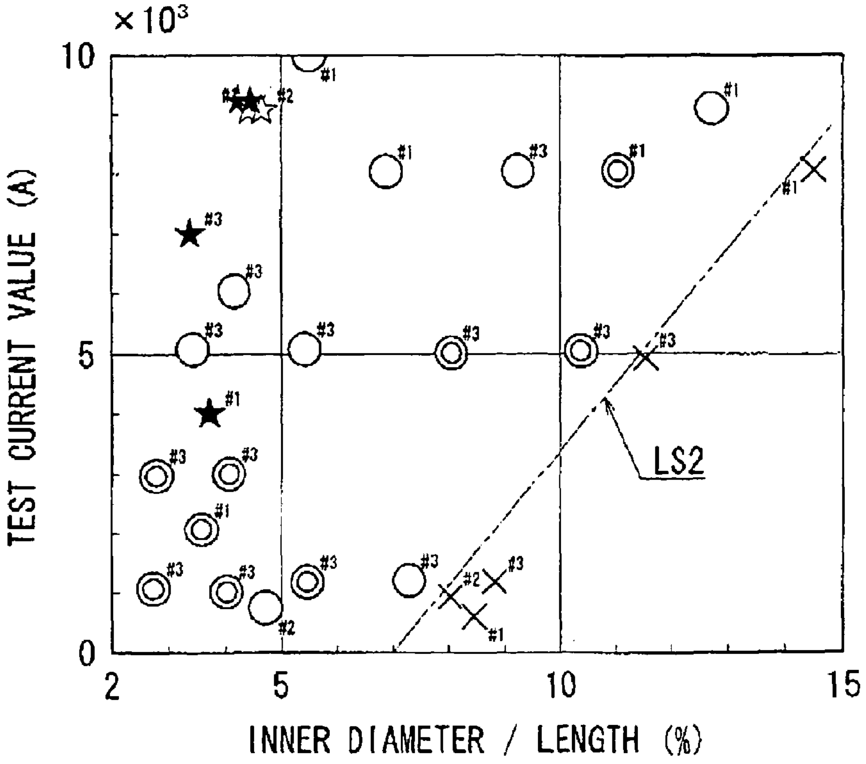
FIG. 6B is a graph such that the result shown in FIG. 6A is represented as an abscissa axis thereof represents a ratio of the inner diameter of the air vent and a length thereof.

Then, a hole diameter (an inner diameter) and a length of the air vent 21*a* are variously altered to manufacture an insulative tube 21 made of MCN and the dynamic current shutoff experiment has been carried out in order to obtain the optimum values of the inner diameter and the length of the air vent 21*a*. In this case, an outer diameter of the air vent 21*a* is 70 mm. In FIG. 6A, its result is plotted on a graph in which a lengthwise axis is defined as a test current value and a lateral axis is defined as an inner diameter. In FIG. 6A, "◎" shows a result that the shutoff is achieved in a half cycle, "○" shows a result that the shutoff is achieved in the cycles of 1 to 1.5, "X" shows a result that the shutoff is not achieved and "★" shows a result that the insulative tube is broken down. Alternatively, the numbers of "#1 to #3" appended to respective plotted points correspond to the length L of the air vent 21*a*. In this case, the "#1" is a sample of L=110 mm, "#2" is a sample of L=130 mm and "#3" is a sample of L=150 mm. In FIG. 6B, the above described result is rewritten where the lateral axis represents (inner diameter d)/(length L).

At first, in FIG. 6A, it is shown that a plotted point of "★" (i.e., a breakdown point) is placed substantially on the same straight line on this graph. This straight line LS1 is obtained as below.

$$d=Ir/2500+2 \text{ (where, an unit is } d \text{ (mm), } I(A))$$

Accordingly, when the maximum fault value is defined as Ir (A) to be shutoff, if d is obtained within a range to satisfy a formula of $d \geqq Ir/2500+2$, it is possible to realize an arcing horn system capable of shutting off the dynamic current without generating the breakdown to such a degree of 10 kA of the accident current.

Alternatively, the breakdown strength upon receiving the inner pressure is generally influenced by the wall thickness. In the thick cylinder, according to a formula of Lame, it is possible to obtain the most stress to be generated at the inner wall surface of the hole. However, assuming that the maximum stress that is obtained when the outer diameter is four times as the inner diameter, even if the outer diameter is increased boundlessly, the maximum stress is merely decreased to such a level of 0.94. Thus, it can be said that, even if a ratio of the outer diameter and the inner diameter is made larger more than necessary, there is no much effect other than the improvement of the strength. Accordingly, with respect to the protection of the breakdown in the large current, it is more advisable to repress the inner pressure to be generated within the air vent 21*a* than making the wall thickness larger. From such a point of view, if the hole diameter d of the air vent 21*a* is set as described above in accordance with the accident current value to be shutoff and the excessive rise in the pressure is prevented, it is possible to realize a more compact arcing horn system capable of shutting off the large current.

On the other hand, in FIG. 6B, it is shown that, as the test current value becomes larger, the shutoff of the current is allowed even if a ratio of the inner diameter and the length, i.e., $\gamma$ (=d/L) is increased. For example, when the test current value is defined as 1 kA, the shutoff is allowed when $\gamma$ is not more than 8% and the shutoff is not allowed when $\gamma$ is not less than 8%. On the contrary, when the test current value is defined as 5 kA, the shutoff is allowed even if $\gamma$ is increased to such a degree of 11%. Then, it is shown that a border line LS2 of this shutoff allowable area and a shutoff unallowable area is substantially a straight line on this graph. This straight line formula is obtained as follows. $d/L=(9\times10^{-6})\cdot I+0.07$ (where, I represents a current value (A))

Accordingly, assuming that the maximum accident current value to be shutoff is Ir (A), it is possible to realize an arcing horn system capable of shutting off the dynamic current upon thunder stroke such that the current equivalent to the above mentioned Ir is flowing by manufacturing the insulative tube 21 as d and L are defined in the range to satisfy a formula of $d/L=(9\times10^{-6})\bullet Ir+0.07$.

Further, the above mentioned border line LS2 crisscrosses the lateral axis substantially at 7%. Accordingly, if the insulative tube 21 is manufactured as determining d and L within the range of $d/L\leqq0.07$, it is possible to realize an arcing horn system capable of shutting off the accident current of several hundred A upon the earth fault in addition to the shutoff of the dynamic current of several hundred kA upon the short circuit fault. Alternatively, in the case that the blow off operation of the arc jet is generated as receiving the thunder stroke, a circumference of the air vent 21*a* of the insulative tube 21 is partially melted and damaged. Hence, in response to the repetition of the thunder stroke, the hole diameter of the air vent 21*a* is gradually increased. Accordingly, in consideration of the usage of the repetition, more desirable upper limit is 0.05 and it is preferable that d and L are set in the range not more than this value.

Figure 1:
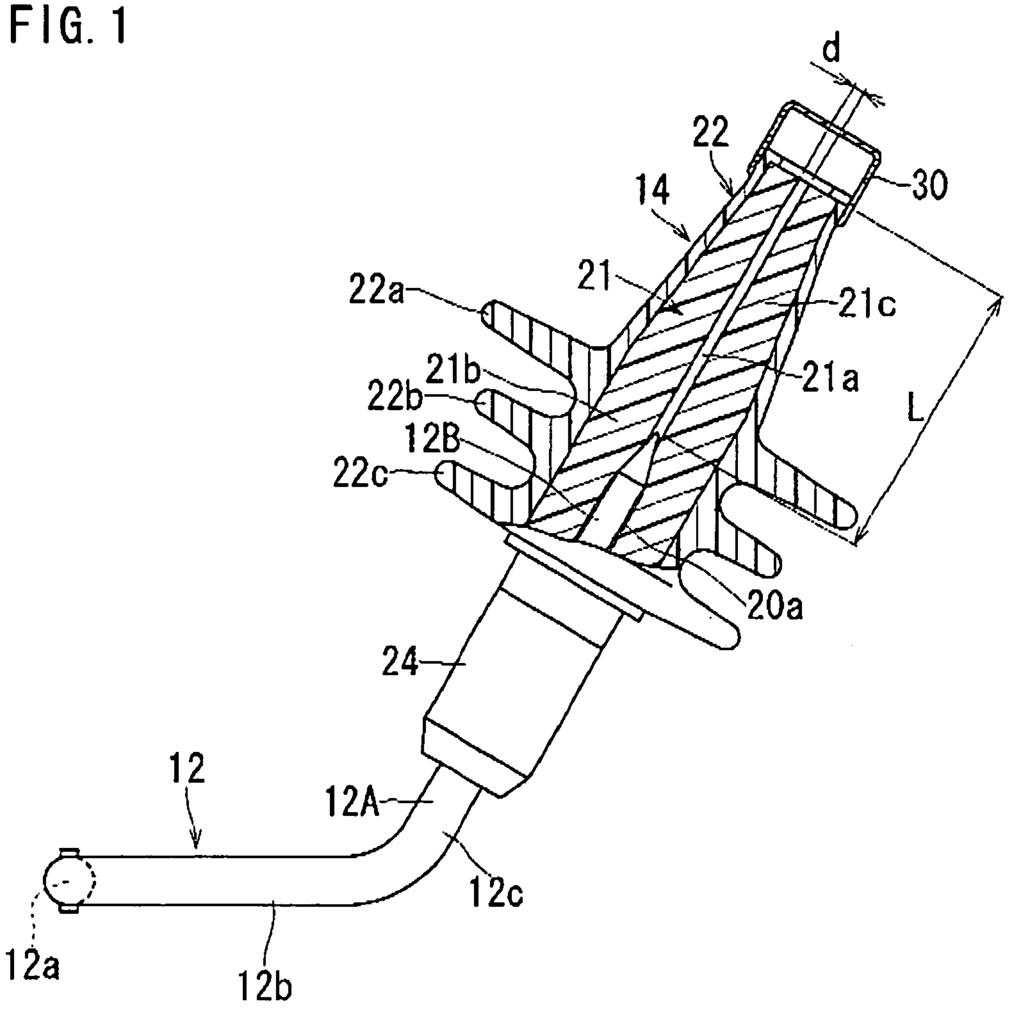
FIG. 1 is a longitudinal sectional view for showing an arcing horn system according to an embodiment of the present invention.

On the basis of the above mentioned index, the arcing horn system according to the above described embodiment shown in the above mentioned FIG. 1 is formed as, for example, an inner diameter of the air valve 21*a*=6 mm and a length thereof=150 mm (an inner diameter/a length=4%). Alternatively, the outer diameter of the above mentioned large diameter area 21*b* in the insulative tube 21 is 70 mm. According to such a constitution, it is possible repeatedly to shutoff the dynamic current upon the short circuit accident over 5 kA as the entire shape of the system is not enlarged.

In the next place, particularly, according to the present embodiment, as shown in the above mentioned FIG. 4, these insulative members 13 and 14 are attached as being inclined, respectively, so that the axial centers of the upper and lower insulative members 13 and 14, namely, the center lines of respective air vents 21*a* are made a blunt angle. A reason for employing such a constitution will be explained below.

Figure 7A:
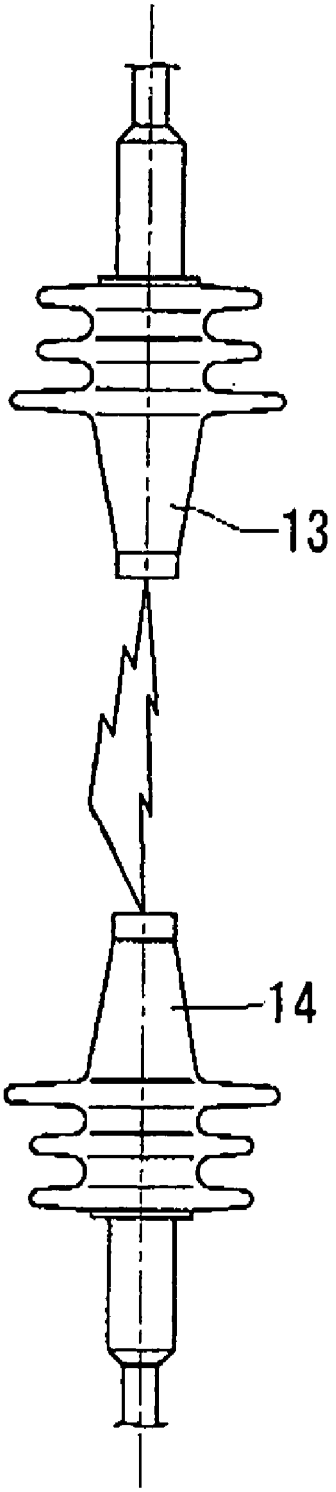
FIG. 7A is a simplified view for showing a condition that insulative tubes are placed on the same axis.
Figure 7B:
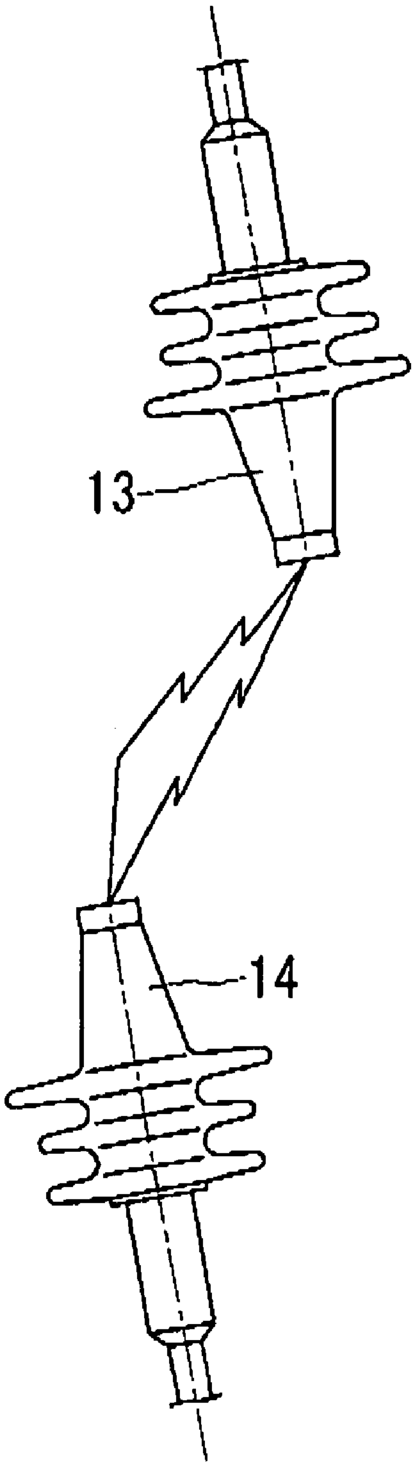
FIG. 7B is a simplified view for showing a condition that the insulative tubes are placed in parallel with each other.
Figure 7C:
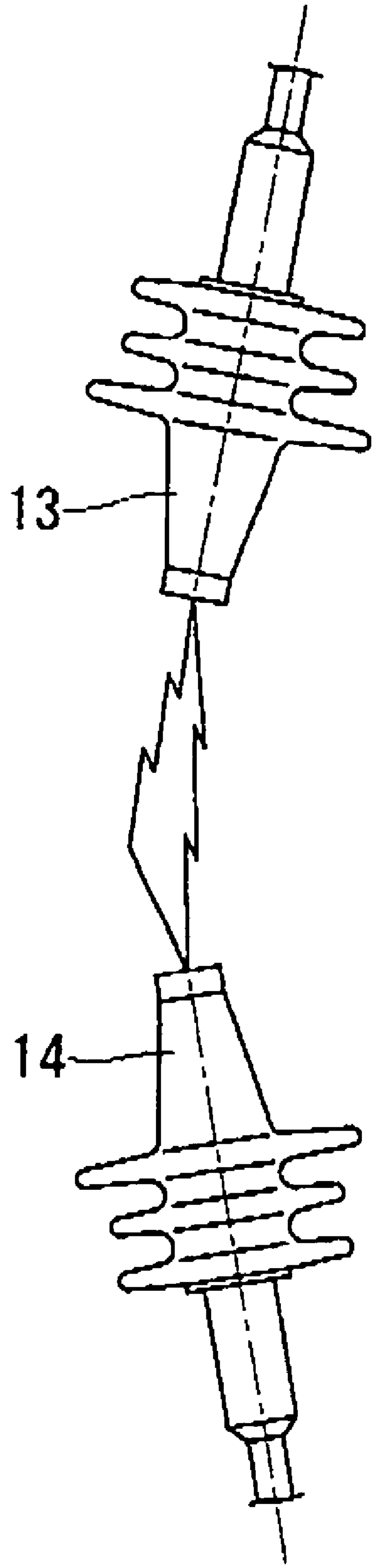
FIG. 7C is a simplified view for showing a condition that the center lines of the insulative tubes are placed at a certain angle with each other.
Figure 8A:
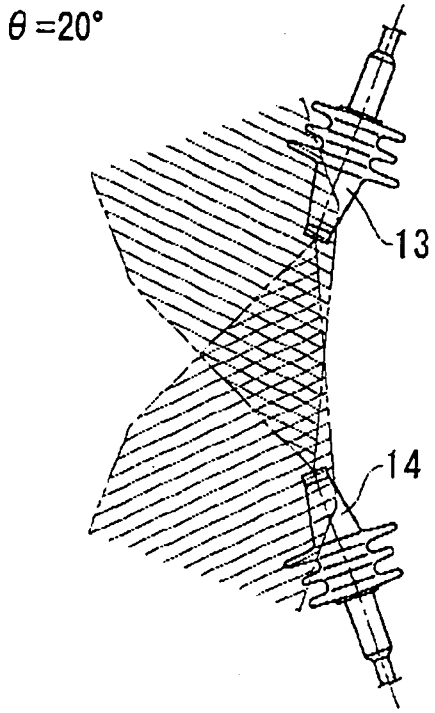
FIG. 8A is an explanatory view for showing a blowoff condition of the arc jet in the case that a swing angle is defined as 20 degrees when a distance between front ends of respective insulative tubes at a ground side and at a electric line side is 350 mm.
Figure 8B:
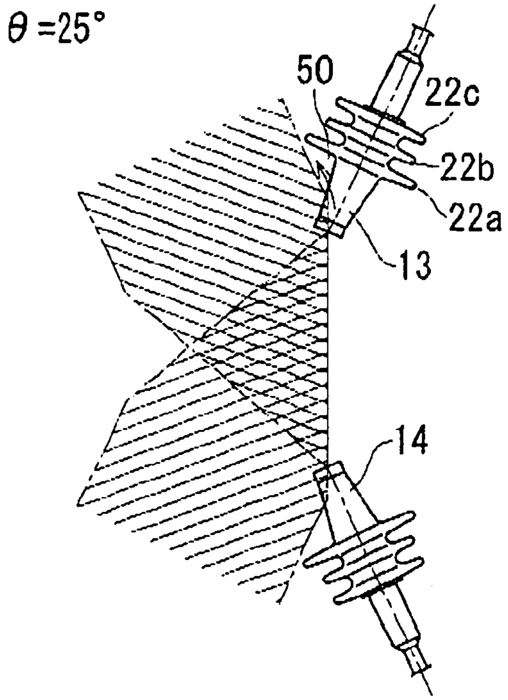
FIG. 8B is an explanatory view for showing a blowoff condition of the arc jet in the case that a swing angle is defined as 25 degrees when a distance between front ends of respective insulative tubes at a ground side and at a electric line side is 350 mm.
Figure 8C:
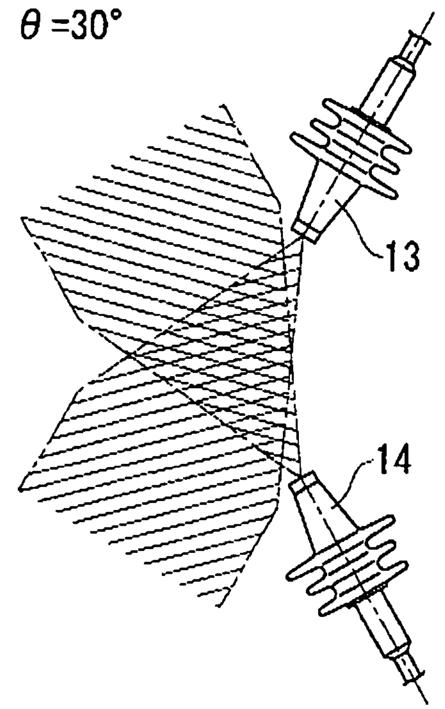
FIG. 8C is an explanatory view for showing a blowoff condition of the arc jet in the case that a swing angle is defined as 30 degrees when a distance between front ends of respective insulative tubes at a ground side and at a electric line side is 350 mm.
Figure 8D:
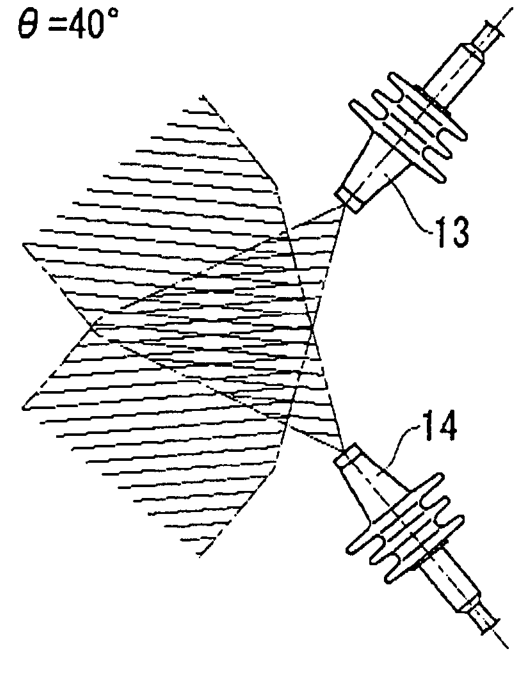
FIG. 8D is an explanatory view for showing a blowoff condition of the arc jet in the case that a swing angle is defined as 40 degrees when a distance between front ends of respective insulative tubes at a ground side and at a electric line side is 350 mm.
Figure 9A:
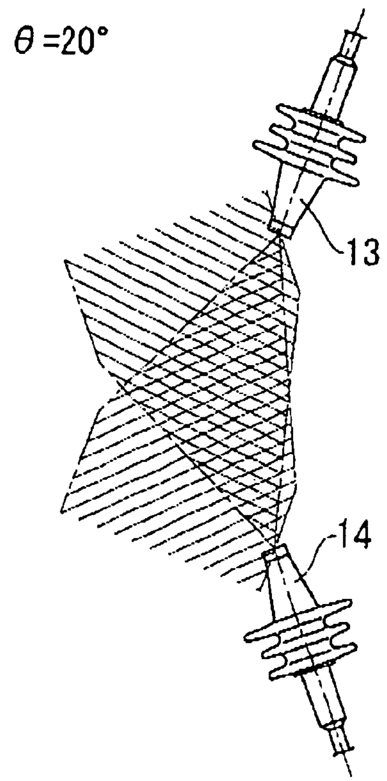
FIG. 9A is an explanatory view for showing a blowoff condition of the arc jet in the case that a swing angle is defined as 20 degrees when a distance between front ends of respective insulative tubes at a ground side and at a electric line side is 500 mm.
Figure 9B:
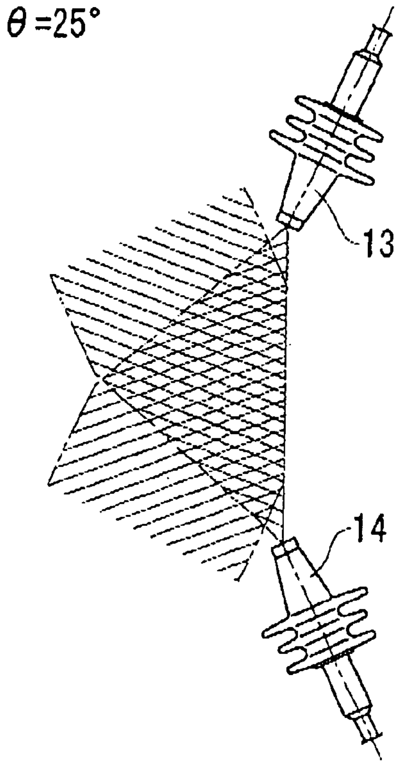
FIG. 9B is an explanatory view for showing a blowoff condition of the arc jet in the case that a swing angle is defined as 25 degrees when a distance between front ends of respective insulative tubes at a ground side and at a electric line side is 500 mm.
Figure 9C:
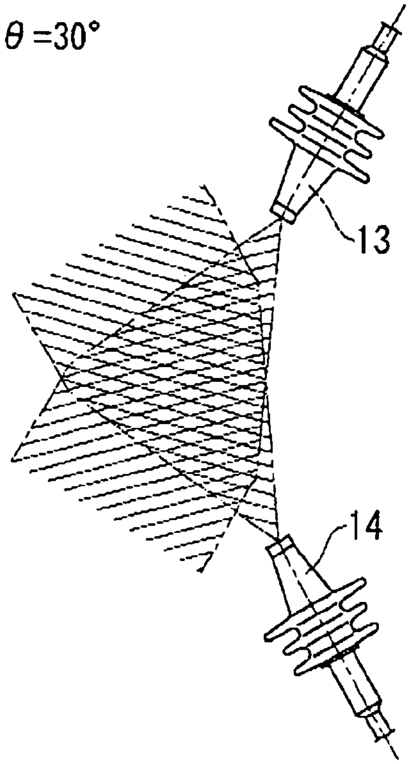
FIG. 9C is an explanatory view for showing a blowoff condition of the arc jet in the case that a swing angle is defined as 30 degrees when a distance between front ends of respective insulative tubes at a ground side and at a electric line side is 500 mm.
Figure 9D:
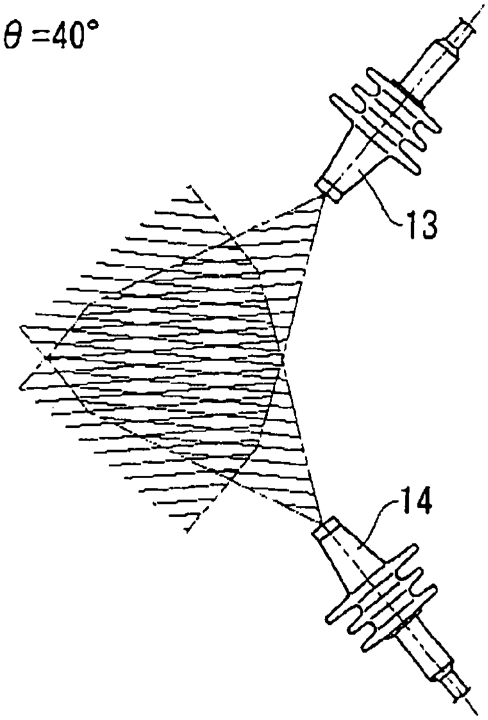
FIG. 9D is an explanatory view for showing a blowoff condition of the arc jet in the case that a swing angle is defined as 40 degrees when a distance between front ends of respective insulative tubes at a ground side and at a electric line side is 500 mm.

A table 4 indicates an example of a result of a dynamic current shutoff experiment as the attached conditions of respective insulative members 13 and 14 are variously altered. In the table 4, an "opposed" attached condition means a condition such that respective insulative members 13 and 14 are placed on the same axis as being opposed as shown in FIG. 7A, a "parallel" attached condition means a condition such that respective insulative members 13 and 14 are attached as the axial centers thereof being in parallel with each other as shown in FIG. 7B and "a blunt angle" means a condition such that respective insulative members 13 and 14 are attached as the axial centers thereof are inclined by 30 degrees from a vertical line, respectively. Alternatively, all of the above mentioned insulative tubes 21 in respective insulative members 13 and 14 are made of a monomer-cast nylon.

TABLE 4

| Attached condition | Air vent shape: Diameter (mm) | Air vent shape: Length (mm) | Test current (kA) | Success or failure in shutoff |
|---|---|---|---|---|
| Opposed | φ5 | 100 | 1 | X |
| | | | 2 | X |
| Parallel | | | 1 | ○ |
| | | | 2 | X |
| Blunt angle | | | 1 | ○ |
| | | | 2 | ○ |

X: Fail in shutoff due to arc transition,
○: Successful in shutoff

As shown in the table 4, under the "opposed" condition, an electrode point of the arc transition (a phenomenon such that the electrode point of the arc moves to a place of the arcing horn extending from the base end side of the insulative members 13 and 14 across these insulative members 13 and 14) is generated, so that the dynamic current is not shutoff. Additionally, in the "parallel" condition, if the test current is changed from 1 kA to 2 kA, the dynamic current is not shutoff due to the arc transition as same as the above. On the contrary, in the "blunt angle" condition, even in the case that the test current is 2 kA, the dynamic current is shutoff at a half cycle of an alternate current.

FIGS. 8 and 9 typically illustrate the blowoff conditions of the arc jet when the oblique angles (swing angle) θ of respective insulative members 13 and 14 are altered. In these cases, the hole diameter of each air vent 21*a* of respective insulative members 13 and 14 is 6 mm, the length thereof is 150 mm, a distance between the opening ends of each air vent 21*a* is 350 mm in FIGS. 8A to 8D and it is 500 mm in FIGS. 9A to 9D. Then, a case that the swing angle θ is 20 degrees is shown in FIGS. 8A and 9A, a case that the swing angle θ is 25 degrees is shown in FIGS. 8B and 9B, a case that the swing angle θ is 30 degrees is shown in FIGS. 8C and 9C and a case that the swing angle θ is 40 degrees is shown in FIGS. 8D and 9D.

From the above mentioned opening ends of the air vents 21*a*, it is experimentally proved that the arc jet is blown off at the unfolded angle of 50 degrees, respectively. Accordingly, in the case of θ=20 degrees, in the unfolded area of one arc jet, a blowoff port of other arc jet (i.e., the opening end of the air vent 21*a*) is located. As a result, in these arc jet, the blowoff powers are balanced out in the vicinity of respective opening ends of the both air vents 21*a*, so that a condition is easily generated such that the constitutional component of the arc jet is suspended in the area between respective opening ends. Then, as the swing angle θ is sequentially increased in rotation of 25 degrees, 30 degrees and 40 degrees, the opening end of other air vent 21*a* is located at a place deviating from the unfolded area of one arc jet. Hence, the mutual interference in the vicinity of the blowoff port of respective arc jet becomes weak, so that the arc jet is blown off at a high speed, respectively, from the both opening ends.

Further, these arc jets are crisscrossed with each other at a place gradually deviated from the area connecting the both opening ends by a line to the side directions, so that flowing rate components toward the side directions are accelerated with each other at this cross area. As a result, the constitutional components that are contained in these arc jets do not move to the circumferences of respective insulative members 13 and 14 but they quickly fly to the side directions.

A table 5 indicates an example of the dynamic current shutoff experiment in the case that the swing angle is 20 degrees and in the case that the swing angle is 30 degrees.

TABLE 5

| Swing angle | Distance between opening ends (mm) | Test current (kA) | | | | |
|---|---|---|---|---|---|---|
| | | There is no direct current component | | There is direct current component | | |
| | | 5 | 7 | 5 | 6 | 7 |
| 20 degrees | 350 | ○ | X | X | — | — |
| 30 degrees | | ○ | ○ | ○ | ○ | ○ |

X: Fail in shutoff due to arc transition,
○: Successful in shutoff

As shown in the table 5, compared to a case that the swing angle is 20 degrees, when the swing angle is 30 degrees, the dynamic shutoff capability is improved very much. As a result, in the arc jet, within the air vents 21*a* of respective insulative members 13 and 14 and in the vicinity of the opening ends, as described above, the shutoff effect of the arc is obtained depending on the pressure effect and the cooling effect of the arc jet. However, under the condition that the constitutional components in the blown off arc jet are suspended in the circumference, it is estimated that the insulating proof in the air between respective insulative members 13 and 14 is lowered by contrast. In other words, in the arc jet, a conductive component such as a metal component that is generated when the front ends of the arcing horns are melted to be vaporized and an ionic component in the plasma gas or the like is contained. Hence, under the condition that suchlike component is floating in the air, the insulating proof strength in the air is decreased. Therefore, particularly, in the case that the insulative members 13 and 14 are disposed at the both of the ground side and the electric line side, it becomes important to pay attention to the mutual interference of the blown off arc jet and arrange them so that the insulation in the air is quickly recovered.

In the attached conditions of "opposed" and "parallel" shown in the above mentioned FIGS. 7A and 7B, the above described conductive components are apt to be suspending between the opening ends of respective air vents and around the insulative members 13 and 14. Therefore, the insulation in the air is not quickly recovered and the dynamic current is continued in connection with the arc transition. Alternatively, even in the attached condition of "blunt angle", as known from FIGS. 8 and 9, for example, when the swing angle θ is 20 degrees, from the reason as same as the above, it is difficult to shutoff the dynamic current sufficiently, so that it is necessary to make this swing angle θ at least not less than 25 degrees (i.e., the opening angle ϕ is not more than 130 degrees). Hence, the arc jets are crisscrossed with each other as being located from the area connecting the both opening ends by a line to the side directions and further, at this cross area, the flowing components toward the side directions are accelerated with each other, so that the conductive components contained in the arc jet also quickly fly to the side directions. As a result, the insulation in the air is not quickly recovered, so that it is possible to shutoff the dynamic current without generation of the arc transition or the like.

On the other hand, if the swing angle θ becomes too large, it is feared that the flashover path connecting the front ends of respective arcing horns does not keep to the axial center within respective air vents 21*a* but the flashover path is changed in mid course so that it penetrates the side wall of the insulative tube 21. If the flashover is generated along such a pate, the side wall of the insulative tube 21 is broken down. Therefore, in order to prevent this, for example, it is needed that the thickness of the side wall of the insulative tube 21 is made thicker and the insulation resistance is enhanced, so that the entire shape becomes large. Alternatively, the arc does not pass through the interiors of the insulative members 13 and 14, so that the shutoff function may not work. Accordingly, it is preferable that the swing angle θ is not more than 40 degrees at the maximum (the opening angle ϕ between the center lines: not less than 100 degrees) and it is more preferable that the swing angle θ is not more than 35 degrees (ϕ: not less than 110 degrees).

Additionally, as described above, three layers of crimp portions 22*a* to 22*c* in a disc form are disposed to respective insulative members 13 and 14. In addition to the function to repress the arc transition as enlarging a creepage distance for insulation along the outer periphery, particularly, the crimp portion 22*a* at the furthest front end has a function to repress the moving of the arc jet backward. For example, in FIG. 8B, the arc jet that has reached to a front area 50 of the crimp portion 22*a* at the furthest front end is guided as shown by an arrowhead along a surface of this crimp portion 22*a* to flow to the side direction. As a result, the condition is repressed such that the conductive components contained in the arc jet moves further backward than this crimp portion 22*a* at the furthest front end to be suspended. Accordingly, the deterioration of the insulating proof in the air around these insulative members 13 and 14 is prevented, so that the generation of the arc transition is repressed and a good dynamic current shutoff capability is kept.

In response to the unfolded shape of the arc jet and the swing angle θ or the like, adding the above described functions thereto, the outer measurement of the crimp portion 22*a* at the furthest front end is set. On the other hand, it is not needed to add the above described functions to the middle crimp portion 22*b* and the back crimp portion 22*c* that are further backward than this crimp portion 22*a* at the furthest front end, so that, as described above, these backside crimp portions 22*b* and 22*c* are formed so that their diameters are smaller than that of the crimp portion 22*a* at the furthest front end. The specific numerical values will be shown. Namely, assuming that, for example, the outer diameter of the crimp portion 22*a* at the furthest front end is 220 mm, the outer diameters of the backside crimp portions 22*b* and 22*c* are 180 mm, respectively. Such a constitution allows the system to be light and compact, so that it is possible to reduce the entire manufacturing cost. Further, between respective crimp portions 22*a* to 22*c*, a fallen space is formed in which the air is apt to remain, however, a depth toward the inside of its diametrical direction becomes deeper. Hence, even if the conductive component moves backward across the crimp portion 22*a* at the furthest front end, this component quickly flows away from the above described area in which a plurality of crimp portions is formed. Accordingly, this allows the insulation of the ambient atmosphere of the insulative members 13 and 14 to be quickly recovered, so that the dynamic current shutoff capability is improved.

Figure 10A:
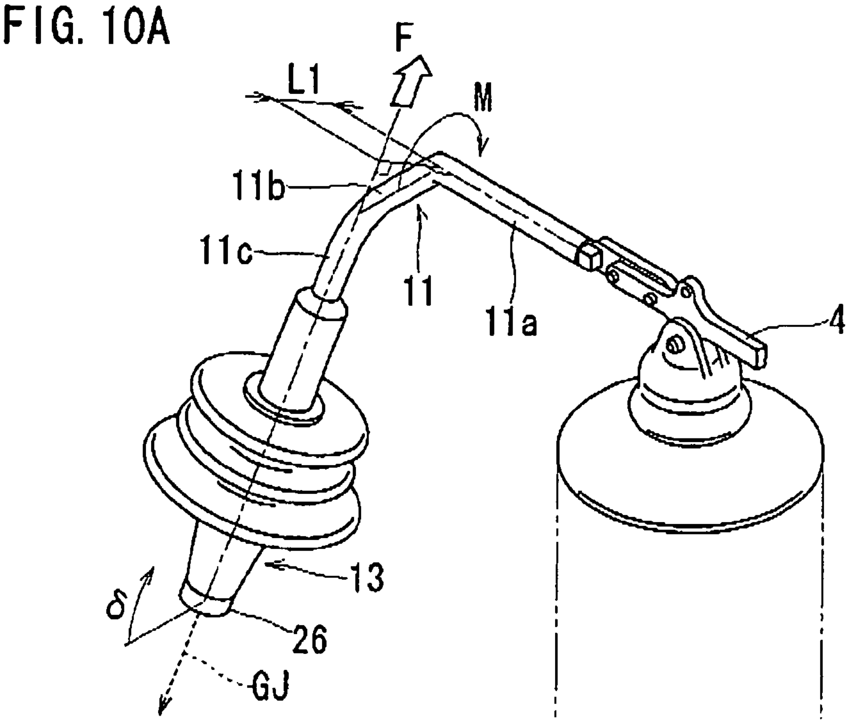
FIG. 10A is a perspective view for showing an arcing horn at the ground side according to the present embodiment.

On the other hand, according to the present embodiment, as described above with reference to FIG. 3 or the like, respective arcing horns at the ground side and the electric line side are formed as two inflected points are provided, respectively. FIG. 10A illustrates the ground side arcing horn 11 once again. According to the arcing horn 11 with such a shape, when the arc jet GJ is blown off from the insulative member 13, its reaction force F acts on the front portion 11*c* of the arcing horn 11 in the axial center direction.

This reaction force F acts on the middle portion 11*b* as a bending moment to a free end of a beam in which connection place with respect to the base end portion 11*a* is defined as a fixed point so as to generate the elastic flexure modification. Alternatively, with respect to the base end portion 11*a*, the above mentioned reaction force F acts on the free end via the middle portion 11*b* so that it also acts on this base end portion 11*a* as a force to generate the elastic flexure modification. Further, since the acting direction of the reaction force F does not crisscross the center line of the base end portion 11*a* but keeps away from it, a twisting moment M (=L1•F) that is obtained by multiplying the above mentioned reaction force F on a distance L1 between respective center lines of the front end portion 11*c* and the base end portion 11*a* acts around the center line of the base end portions 11*a*. Accordingly, the twisting elastic modification is also generated in this base end portion 11*a*.

Figure 10B:
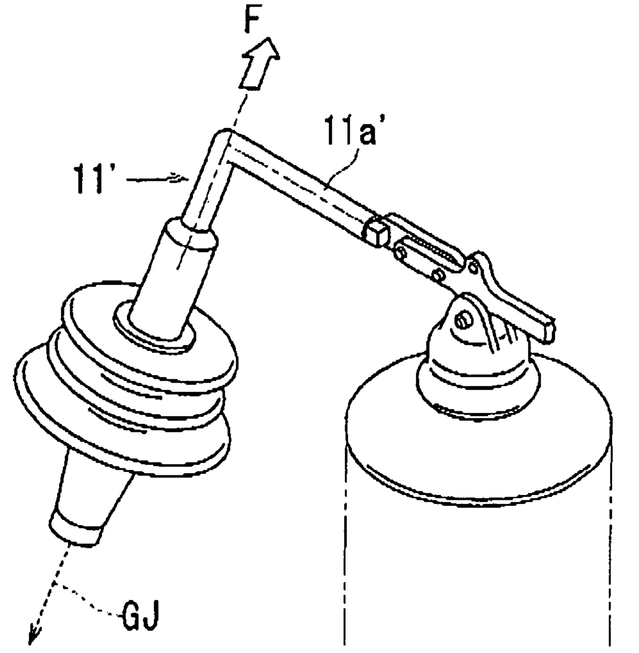
FIG. 10B is a perspective view for showing a conventional arcing horn.

On the contrary, FIG. 10B illustrates a conventional arcing horn 11' that is directly inclined downward from a front end of a base end portion 11*a*' without providing the above described middle portion 11*b*. In this case, the acting direction of the reaction force F of the arc jet GJ crisscrosses the centerline of the base end portion 11*a*', so that the reaction force F only acts on the base end portion 11*a*' as the twisting moment to generate the flexure modification with respect to the base end portion 11*a'*.

In this way, according to the present embodiment, by the reaction force F of the arc jet GJ, particularly, the base end portion 11*a* is provided with the elastic twisting modification. Hence, it is possible to make the displacement amount δ toward the upper part of the front end side, to which the insulative member 13 is attached, larger than before. Additionally, in the above described arcing horn 12 at the electric line side, the displacement amount toward the lower part depending on the reaction force of the arc jet is made larger as same as the above. In accordance with this, the arc length of the arc which has been generated between the front ends of the both arcing horns 11 and 12 is increased and the arc quickly disappears, so that this improves the dynamic current shutoff capability.

A table 6 indicates an example of a comparative experiments of a system that is constructed as disposing the middle portions 11*b* and 12*b* of a length 300 mm, respectively, to the both of the ground side arcing horn 11 and the electric line side arcing horn 12 as shown in FIG. 10A (the swing amount is 300 mm) and a system that is constructed as not disposing suchlike middle portions but disposing the arcing horn in a shape shown in FIG. 10B (the swing amount is 0).

TABLE 6

| Swing amount | X coordinate (mm) | Swing angle θ | Test current | Success or failure in shutoff |
|---|---|---|---|---|
| 300 | 550 | 20 degrees | 9 kA | ○ |
| 0 | | | | X |

As shown in the table 6, when the test current is defined as 9 kA, in the case that the swing amount is 0, the dynamic current is not capable of being shutoff. However, even in this case, the dynamic current is shutoff when the swing amount is 300 mm. Accordingly, if the above described shape of the arcing horn is employed so that the elastic modification amount upon the arc jet blowoff is made larger, it is possible to realize an arcing horn system which is provided with the higher-efficiency dynamic current shutoff property.

Alternatively, according to the above described embodiment, a constitution is described such that the swing angles θ of the front end portions 11*c* and 12*c* of respective arcing horns 11 and 12 at the ground side and the electric line side are the same with each other. However, it is also possible to realize a constitution such that these swing angles are different from each other.

Additionally, according to the above described embodiment, a constitution is described such that the middle portions 11*b* and 12*b* are respectively disposed to the both of respective arcing horns 11 and 12 at the ground side and the electric line side. However, it is also possible to realize a constitution such that this middle portion is only disposed to any one of the arcing horns 11 and 12 at the ground side and the electric line side so that the elastic modification amount upon the blowoff of the arc jet is larger than before only in one arcing horn.

Figure 11:
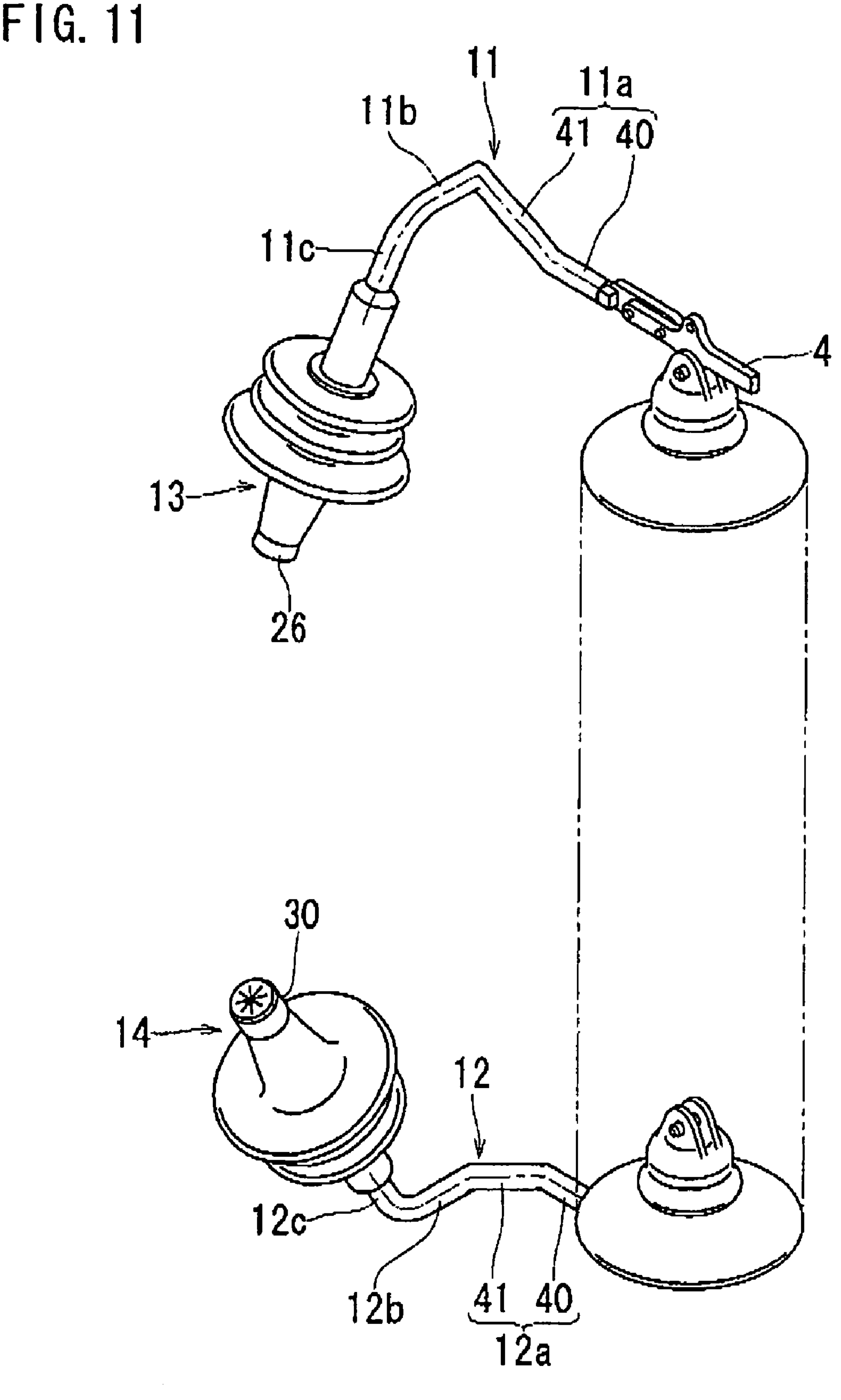
FIG. 11 is a perspective view for showing an arcing horn system that is annexed to an insulator set according to other embodiment.

Further, according to the above described embodiment, a constitution is described such that the base end portions 11*a* and 12*a* of respective arcing horns 11 and 12 and the middle portion 11*b* and 12*b* are formed in a straight line, respectively. However, for example, as shown in FIG. 11, they may be formed as the inflecting portions are provided thereto. According to an example shown in FIG. 11, respective base end portions 11*a* and 12*a* are formed at the front ends of the base portions 40 that are substantially horizontally fixed to the above described ground side horn attaching cramp 4 and the electric line side horn attaching cramp 6, respectively, in a shape such that inclined portions 41, which are inclined vertically, are continued. According to such a shape, a distance between respective front end surfaces of the upper and lower insulative members 13 and 14 (i.e., an outer discharge gap) is adjusted. On the other hand, for example, it is also possible to constitute the arcing horn system according to the present embodiment as the middle portion 11*b* and 12*b* connecting the base end portions 11*a* and 12*a* and the front end portions 11*c* an 12*c* are inflected across the entireness thereof. Alternatively, if the swing angles θ of the front end portions 11*c* and 12*c* of respective arcing horns 11 and 12 are made larger, for example, not less than 30 degrees, it is possible to obtain the sufficient dynamic current shutoff property as shown in FIG. 10B even if the present arcing horn is not provided with the middle portions 11*b* and 12*b*.

By the way, according to this arcing horn system, the cap 30 is employed in order to repress the intrusion of the rain water into the front end side of the insulative member 14. This cap 30 is provided with opening means for allowing the blowoff of the arc jet. Particularly, in the above described case, the cap 30 is provided with opening means that is consisted of the penetration hole 34 and the movable body 36 consisted of the elastic-transformable sectioned pieces 32*a*. This enables to obtain a desirable dynamic current shutoff capability because the blowoff power of the arc jet and the unfolded condition thereof are hardly inhibited. Alternatively, the cap 30 is not dropped off from the arc jet. Accordingly, since the intrusion of the rain water into the air vent 21*a* is continuously prevented, even if the thunder stroke is repeated, the dynamic shutoff capability is stably effected for each time and it is possible to use this arcing horn system repeatedly.

Alternatively, according to the above described embodiment, as described above, under the condition that respective front end portions of the arcing horns 11 and 12 are placed at the large diameter area 21*b* in the insulative tube 21, the insulative tubes 21 are assembled and then, the further front end side than the large diameter area 21*b* is formed in a taper shape. In other words, the rise in the pressure and the temperature when the arc jet is generated is the highest at the base end area of the air vent 21*a*, to which the front end portion of the arcing horn is facing, so that the breakdown may be generated from this point as a crack. Therefore, if the wall thickness (the outer diameter) thereof is set so as to have the enough breakdown strength in this area. On the other hand, the pressure at the further front end side than this area is gradually lowered. Accordingly, in this area, it is not needed to set the wall thickness in consideration of the above mentioned breakdown strength, so that the wall thickness of this area is smaller. Hence, it is possible to realize the more compact and light arcing horn system and it is possible to lower the manufacturing cost thereof.

Alternatively, according to the above described embodiment, upon providing the insulative tubes 21 at respective front end sides of the arcing horns 11 and 12, a male thread 20*a* is formed at the outer periphery of the front end side of the arcing horn and the insulative tubes 21 is screwed into this. Conventionally, for example, the tube made of a vinyl chloride is provided by the insert molding such that the front end cramp of the arcing horn is arranged in the molding tool. A heat history that is cooled and solidified after melting with heat is added to the insulative tube in this case. On the contrary, according to the present embodiment, such a heat history is not added and the insulative tube 21 is assembled to the front end side of the arcing horn. Accordingly, a good property of the polyamide resin, particularly, a good property of MCN is not damaged also in this assembling step as same as the above mentioned assembling case of the insulative tube 21 and the coating layer 22, so that the deterioration of the breakdown strength is repressed and it is possible to realize a more stable dynamic current shutoff system. Alternatively, when the arc jet is blowing off, due to the generation of the high pressure within the air vent 21*a*, it is feared that the insulative tube 21 is dropped off from the arcing horn. However, it is also possible to prevent suchlike dropping more certainly by the above described screw connection.

Further, according to the above described embodiment, the outer periphery of the insulative tube 21 is covered with the coating layer 22 consisted of a soft vinyl chloride and the crimp portions 22*a* to 22*c* are integrally formed on this coating layer 22. By providing suchlike crimp portions 22*a* to 22*c*, the creepage distance for insulation in an axial direction becomes longer, so that the arc transition is repressed such that the electrode point of the arc moves to the base end side of the arcing horn from the arcing horn front end across the insulative members (the dynamic current shutoff system) 13 and 14. Alternatively, since the insulative tube 21 is coated with the coating layer 22 made of a soft material, assuming that the insulative tube 21 is broken down, it is possible to prevent the insulative tube 21 from being flown and dropped by the coating layer 22.

Figure 12:
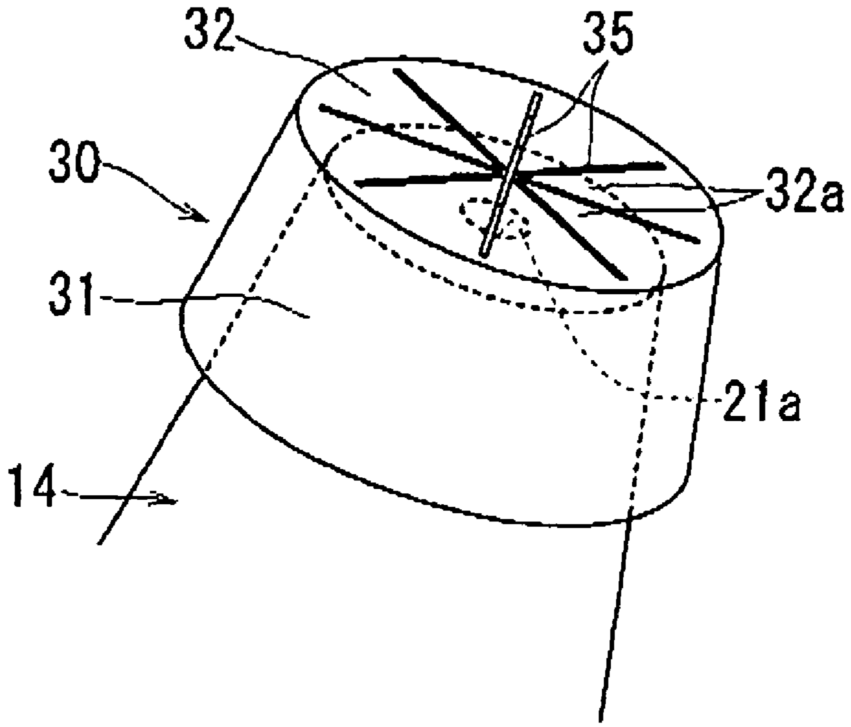
FIG. 12 is a perspective view for showing a first modified embodiment of a cap covering a front end side of an insulative member.

In the next place, a modified embodiment of the cap 30 will be described below. At first, as same as the above cases in the cap 30 shown in FIG. 12 illustrating a first modified embodiment, the sectioned pieces 32*a* that are capable of being elastically transformed individually are formed by providing the slits 35 to the wall portion 32. However, a hole equivalent to the above mentioned penetration hole 34 is not particularly provided on its center but a gap like a needle hole is defined in the center.

Accordingly, it is possible to prevent the rain water from intruding into the lower part through the penetration hole 34 in the above case, so that, in the embodiment shown in the drawing, without providing the above mentioned space 33 between the wall portion 32 and the front end surface of the insulative member 14 and the above mentioned water drain opening 37 in the circular cylinder portion 31, this cap 30 is attached to the insulative member 14 as the front end surface of the insulative member 14 abuts against the wall portion 32 from the lower side.

In such a constitution, upon the operation, respective sectioned pieces 32*a* are elastically transformed, so that the blowoff condition of the arc jet is not inhibited and further, the intrusion of the rain water upon the nonaction, the intrusion of the rain water is prevented.

Figure 13A:
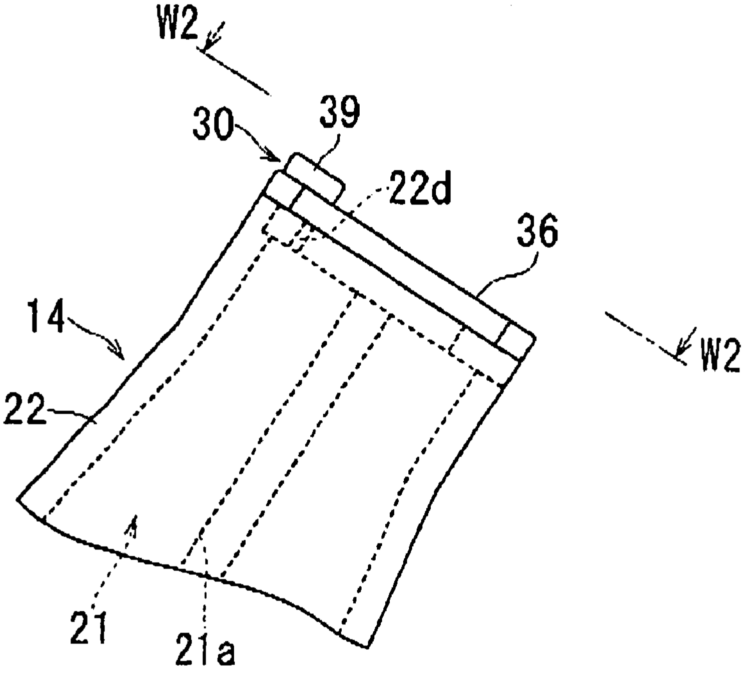
FIG. 13A is a lateral view for showing a second modified embodiment of a cap.
Figure 13B:
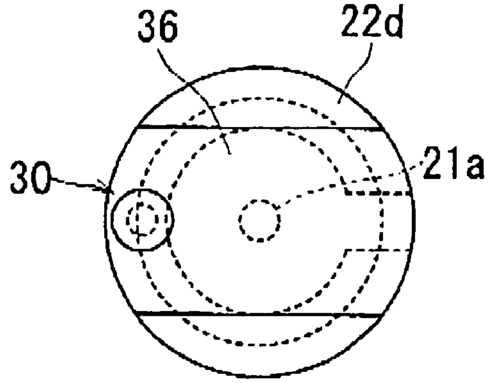
FIG. 13B is a cross sectional view cut by a line of W2-W2 arrowhead shown in FIG. 13A.

In FIGS. 13A and 13B showing a second modified embodiment, on the front end surface of the insulative member 14, the cap 30 only consisted of the movable body 36 that is substantially rectangular flat plate from the plane view is attached. This movable body 36 is manufactured by a soft vinyl chloride as same as the above and the thickness thereof is set in the thickness having a sufficient elastic transformation capability and then, at the end portion upper side (a left end side in the drawing), this movable body 36 is fixed on the circle coated portion 22*d* of the coating layer 22 in the insulative member 14 by a insulating screw bolt 39.

Figure 13C:
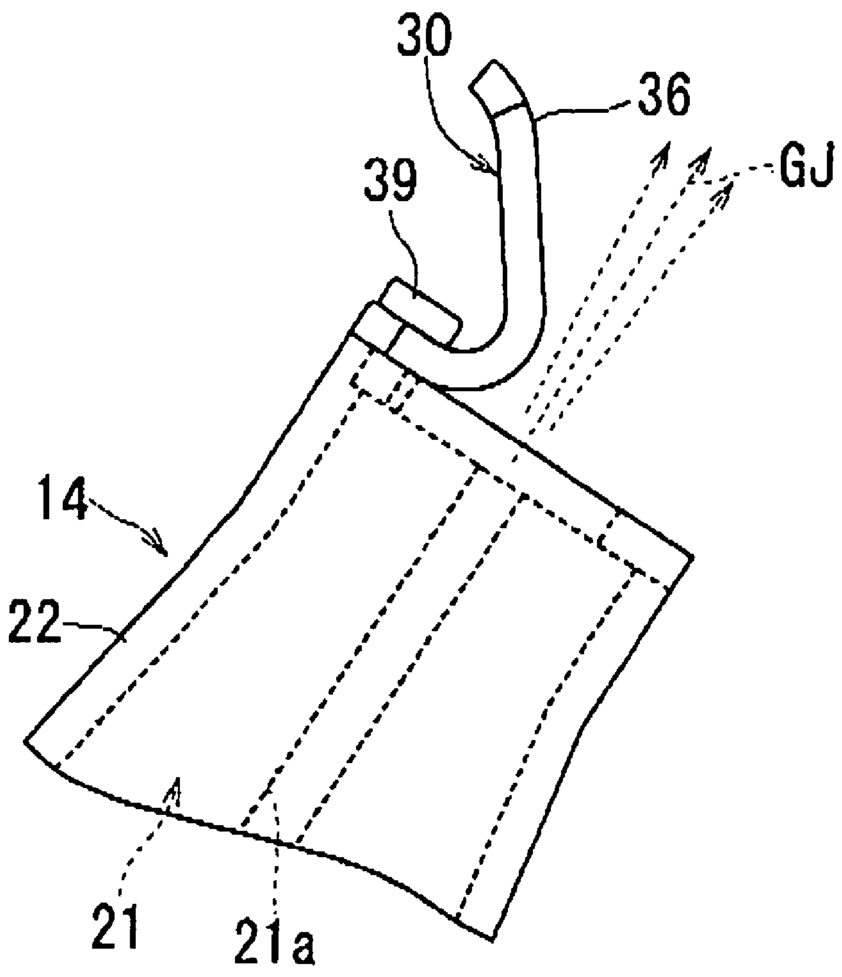
FIG. 13C is a lateral view for showing the operational condition upon the blowoff of the arc jet at the cap according to the second modified embodiment.

Upon the operation such that the arc jet is blown off, as shown in FIG. 13C, the above mentioned movable body 36 is depressed by the blowoff power of the arc jet GJ to be inflected and transformed, so that the movable body 36 is evacuated through a blowoff path of the arc jet GJ. Upon the nonaction, the movable body 36 returns to the position shown in FIGS. 13A and 13B by the elastic restoring force, so that the intrusion of the rain water into the air vent 21*a* is prevented.

Figure 14A:
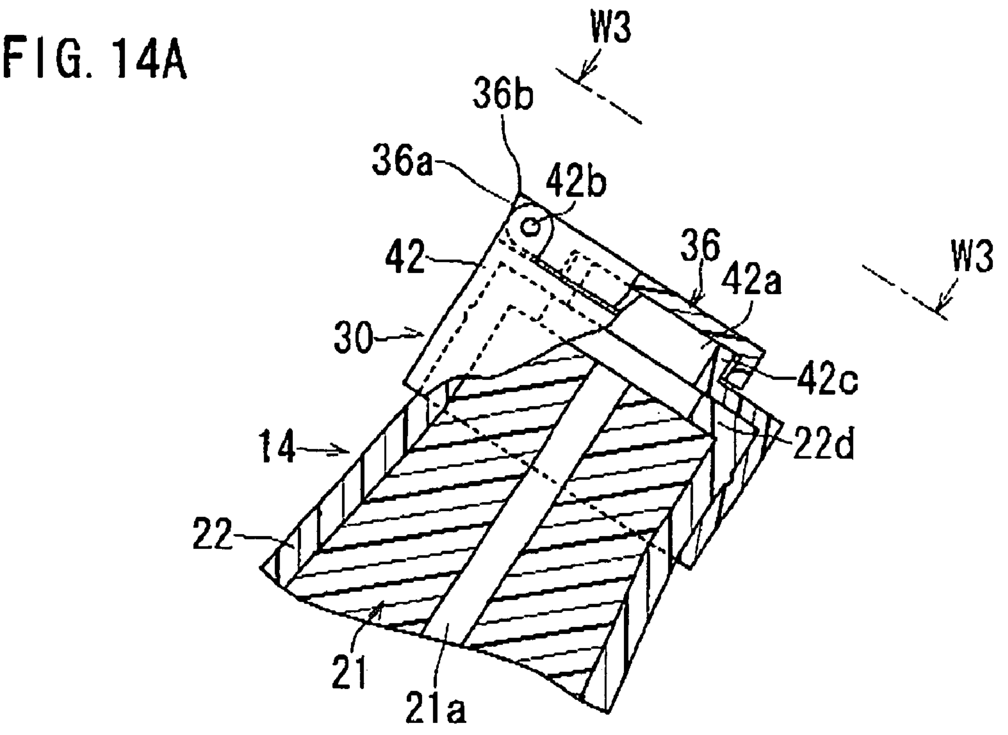
FIG. 14A is a partial sectional lateral view for showing a third modified embodiment of a cap covering a front end side of an insulative member.
Figure 14B:
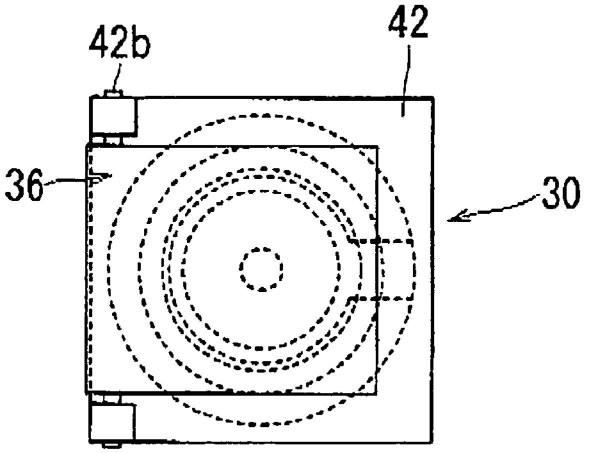
FIG. 14B is a cross sectional view cut by a line of W3-W3 arrowhead shown in FIG. 14A.

The cap 30 shown in FIGS. 14A and 14B illustrating a third modified embodiment is provided with a frame 42 that is secured so as to surround the outer periphery of the front end side of the insulative member 14 and on the upper surface of this frame 42, the movable body 36 that is substantially rectangular flat plate from the plane view is attached. At the center of the frame 42, a penetration path 42*a*, of which diameter is rather smaller than that of the above mentioned circle coated portion 22*d* in the insulative member 14, is formed.

The movable body 36 is rotatably attached on the upper surface of the frame 42 at the upper end portion side (a left end side in the drawing) by an axis portion 42*b* around this axis portion 42*b* and the movable body 36 is retained on the upper end surface of a surrounding wall 42*c* to surround the above described penetration path 42*a* as abutting against this upper end surface of a surrounding wall 42*c* with a lid on this upper end surface. Alternatively, a side surface 36*a* at the further outside than the axis portion 42*b* in the movable body 36 is made at a certain angle. Therefore, as described later, an angular portion 36*b* between this side surface 36*a* and the upper surface of the frame 42 functions as an opening position regulating point for regulating the fully opening positions with the lid off.

Figure 14C:
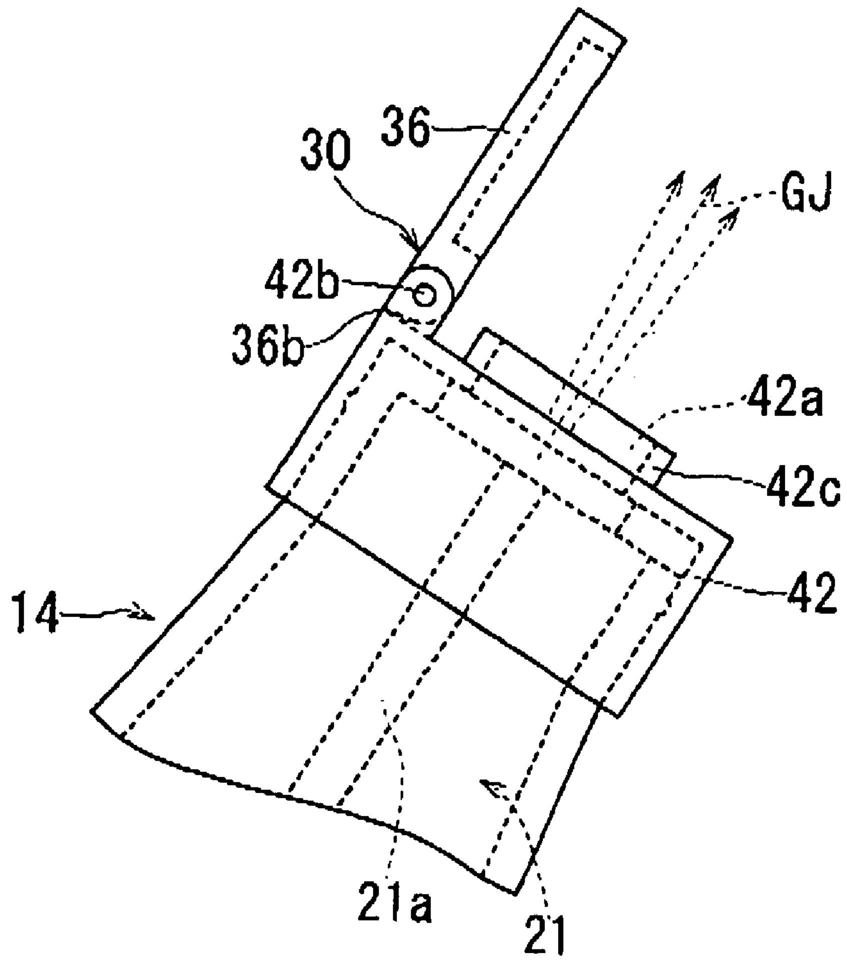
FIG. 14C is a lateral view for showing the operational condition upon the blowoff of the arc jet at the cap according to the third modified embodiment.

Upon the operation such that the arc jet is blowing off, as shown in FIG. 14C, the movable body 36 is depressed by the blowoff power of the arc jet GJ and then, the movable body 36 rotates around the axis portion 42*b* in a counterclockwise direction in the drawing to be opened, so that the movable body 36 is evacuated through a blowoff path of the arc jet GJ. If this movable body 36 rotatably moves to a position substantially in parallel with the axial center direction of the insulative member 14 as shown in the drawing, the above mentioned angular portion 36*b* abuts against the upper surface of the frame 42, so that the above mentioned rotation operation is inhibited and the movable body 36 is retained at this evacuation position. Accordingly, if the blowoff of the arc jet GJ is stopped, the movable body 36 rotates around the axis portion 42*b* in a clockwise direction by its own weight. Then, as shown in FIGS. 14A and 14B, the movable body 36 returns to the lid-on condition and hereinafter, the intrusion of the rain water is inhibited.

Figure 15:
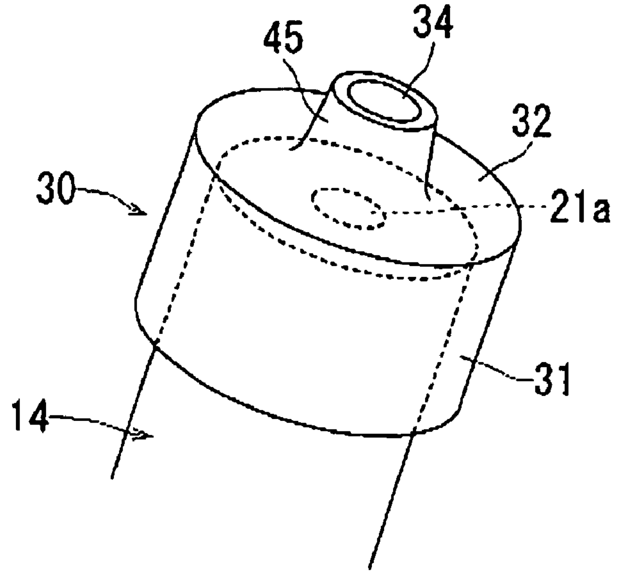
FIG. 15 is a perspective view for showing a forth modified embodiment of a cap.

As about the same as the embodiments that are explained with reference to the above described FIGS. 5A, 5B and 5C, the cap 30 shown in FIG. 15 illustrating a fourth modified embodiment is formed in a cap shape having the circular cylinder portion 31 and the circular wall portion 32 for covering the upper end of this circular cylinder portion 31 and the projection 45 is provided on the center of the end surface (i.e., the front end surface) of the wall portion 32 to project upward with a circular cross section thereof. On this projection 45, the penetration hole 34 penetrating vertically is provided as open/close means allowing the blowoff of the arc jet.

In this case, the rain water fallen on the wall portion 32 flows around the projection 45 when flowing down on the end surface of this wall portion 32, so that it does not intrude in the penetration hole 34 opening to the upper surface of the projection 45. Accordingly, the rain water to directly enter the penetration hole 34 only intrudes into the cap 30, so that it is possible to repress the intrusion amount of the water sufficiently. As a result, the intrusion of the rain water into the above mentioned air valve 21*a* is repressed and a desirable dynamic current shutoff capability is capable of being maintained.

Figure 16:
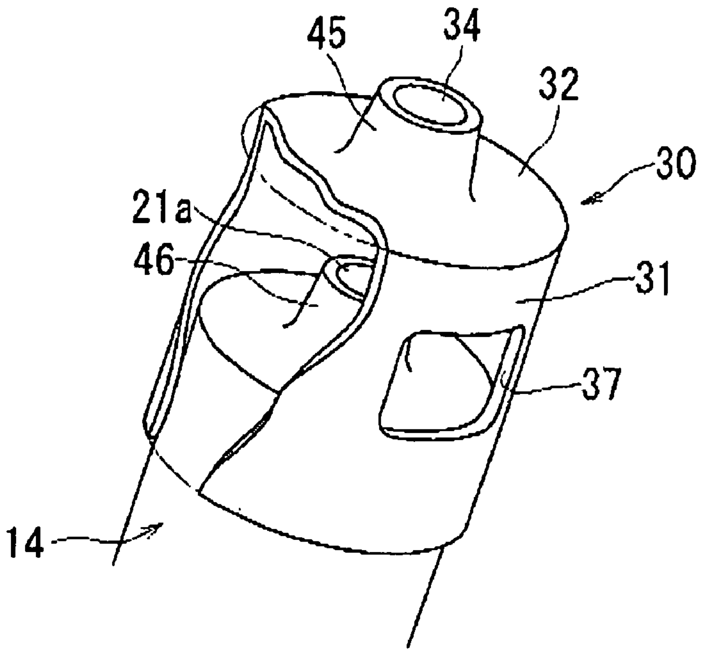
FIG. 16 is a perspective view for showing a fifth modified embodiment of a cap.

The cap 30 shown in FIG. 16 illustrating a fifth modified embodiment is formed in the same way as the cap 30 shown in FIG. 15, namely, the penetration hole 34 is defined in the projection 45, which is defined on the center of the wall portion 32. However, in this case, spacing between the wall portion 32 of the cap 30 and the front end surface of the insulative member 14 as same as the embodiment that is explained with reference to the above described FIGS. 5A, 5B and 5C, this cap 30 is attached to the insulative member 14. Additionally, at a peripheral wall of the circular cylinder portion 31, the water drain opening 37 as same as the above is defined. Further, on the front end surface of the insulative member 14, the projection 46 is provided on the center of thereof as projecting upward and the above mentioned air valve 21*a* is opened on the upper end surface of this projection 46. In the other words, the front end opening portion (i.e., the upper opening portion) of this projection 46 becomes an arc jet blowing off port of the air vent 21*a*.

According to such a constitution, the rain water to intrude in the cap 30 as directly entering the penetration hole 34 flows down along the front end surface of the insulative member 14 to be discharged to the outside through the water drain opening 37. Particularly, with respect to the rain water to flow on the front end surface of this insulative member 14, depending on the constitution such that the air vent 21*a* is opened on the upper surface of the projection 46, this rainwater is more certainly prevented from intruding into the air vent 21*a*.

Figure 17:
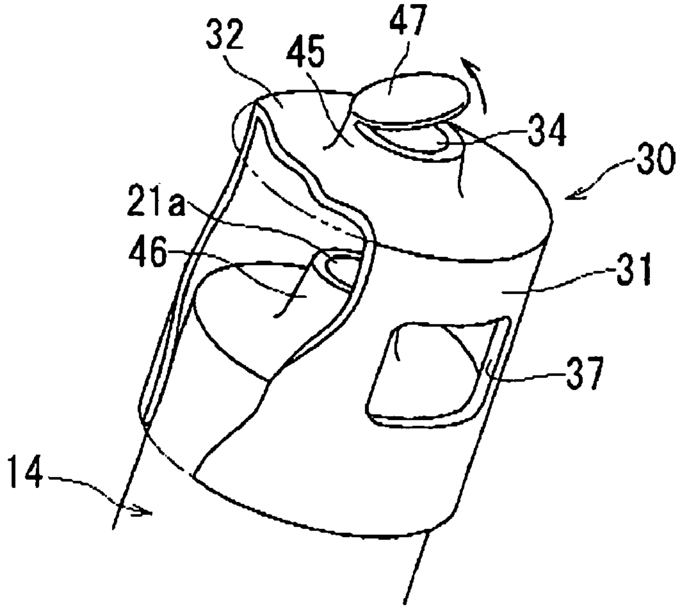
FIG. 17 is a perspective view for showing a sixth modified embodiment of a cap.

According to the cap 30 shown in FIG. 17 illustrating a sixth modified embodiment, in addition to the constitution shown in FIG. 16, further, an open/close cover 47 is provided to open and close the upper end opening of the penetration hole 34. As substantially same as the embodiment that is explained with reference to the above mentioned FIG. 13, this open/close cover 47 is depressed and moved upward from a rain water intrusion preventing position to fill the penetration hole 34 by the blowoff power of the arc jet to be elastically inflected and transformed, so that this open/close cover 47 is capable of moving to a position where it is evacuated through the blowoff path of the arc jet. By providing the above described open/close cover 47, it is possible to prevent the intrusion of the rain water more certainly.

Figure 18:
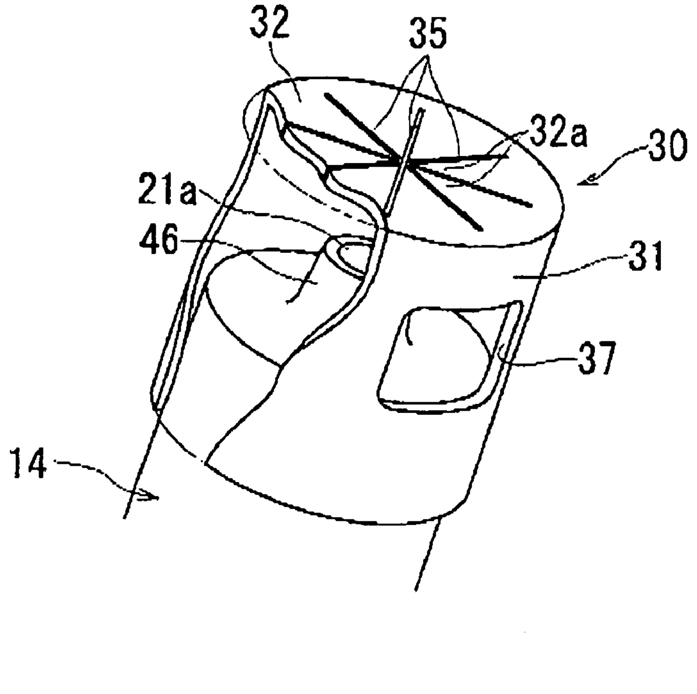
FIG. 18 is a perspective view for showing a seventh modified embodiment of a cap.

The cap 30 shown in FIG. 18 illustrating a seventh modified embodiment is constituted as same as the embodiment shown in the above described FIG. 16 except for the wall portion 32 of the cap 30. In the wall portion 32 of this case, the slits 35 that are capable of being elastically transformed individually are formed as abutting with each other in a peripheral direction by providing the slits 35 to the wall portion 32 as same as the embodiment that is described above with reference to FIG. 12, so that it is possible to prevent the intrusion of the rain water upon the nonaction.

Figure 19A:
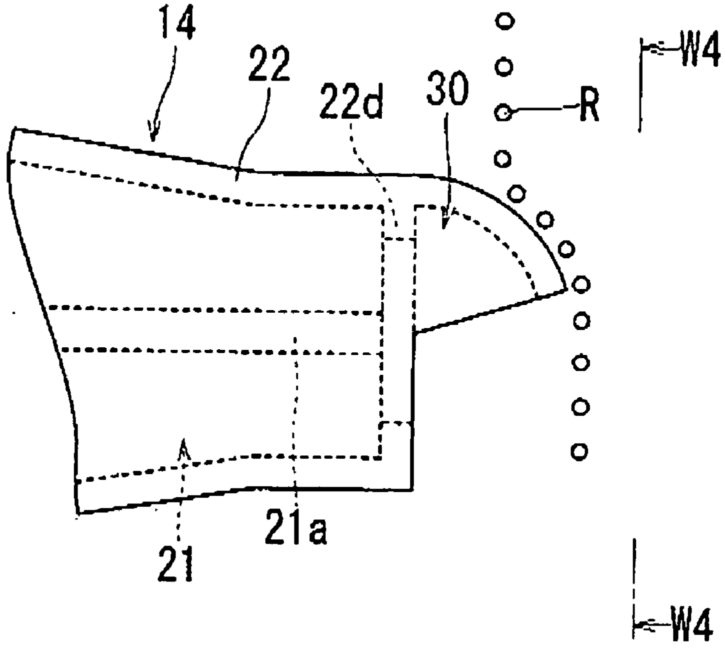
FIG. 19A is a perspective view for showing an eighth modified embodiment of a cap.
Figure 19B:
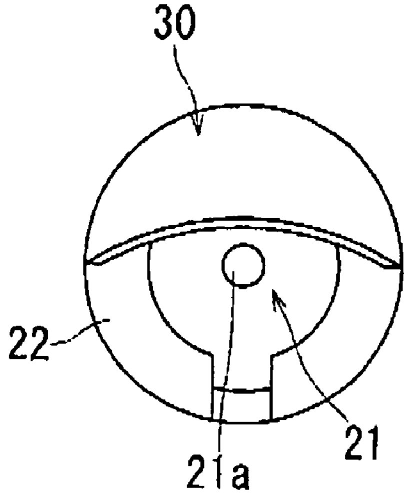
FIG. 19B is a cross sectional view cut by a line of W4-W4 arrowhead shown in FIG. 19A.
Figure 20:
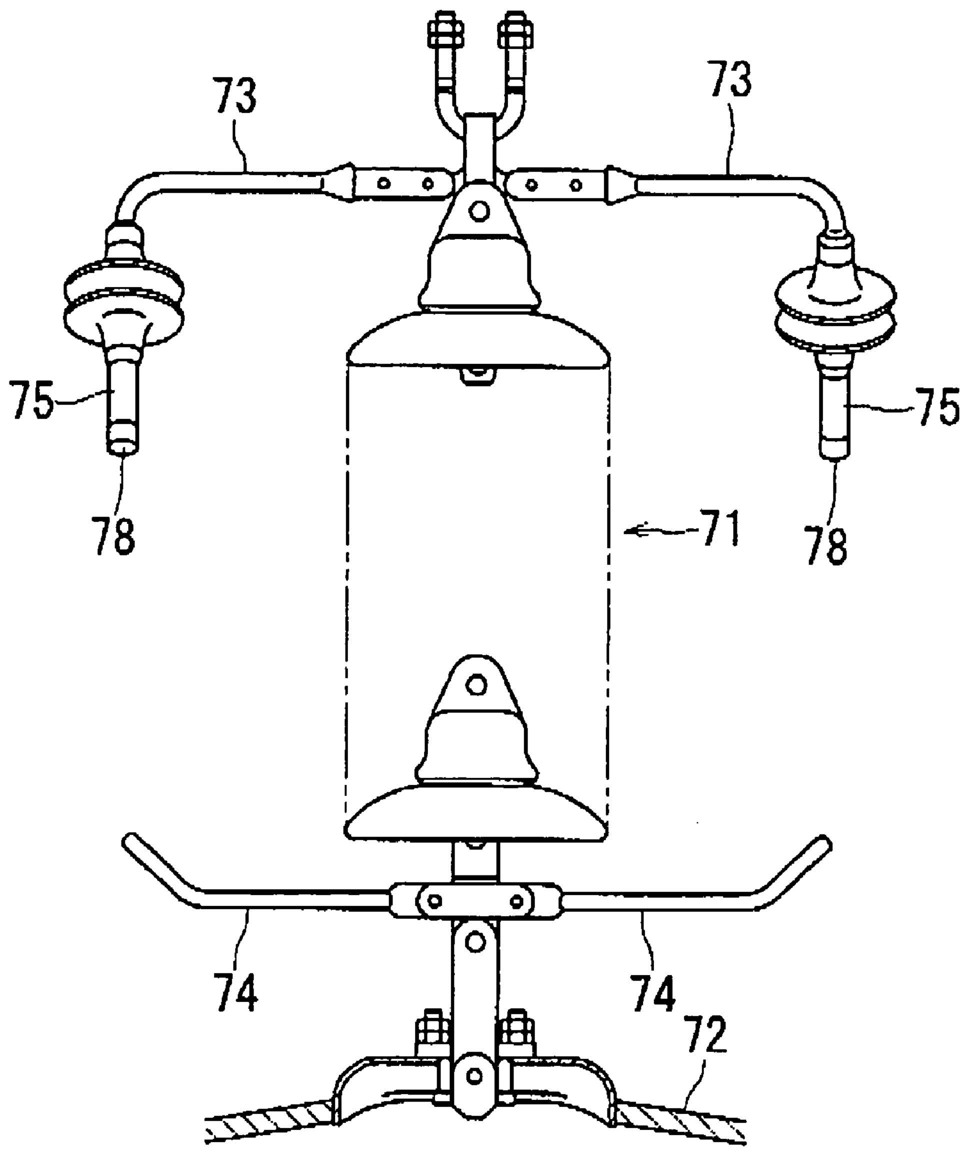
FIG. 20 is a front view for showing a suspension type insulator set to which a conventional arcing horn system is annexed.
Figure 21:
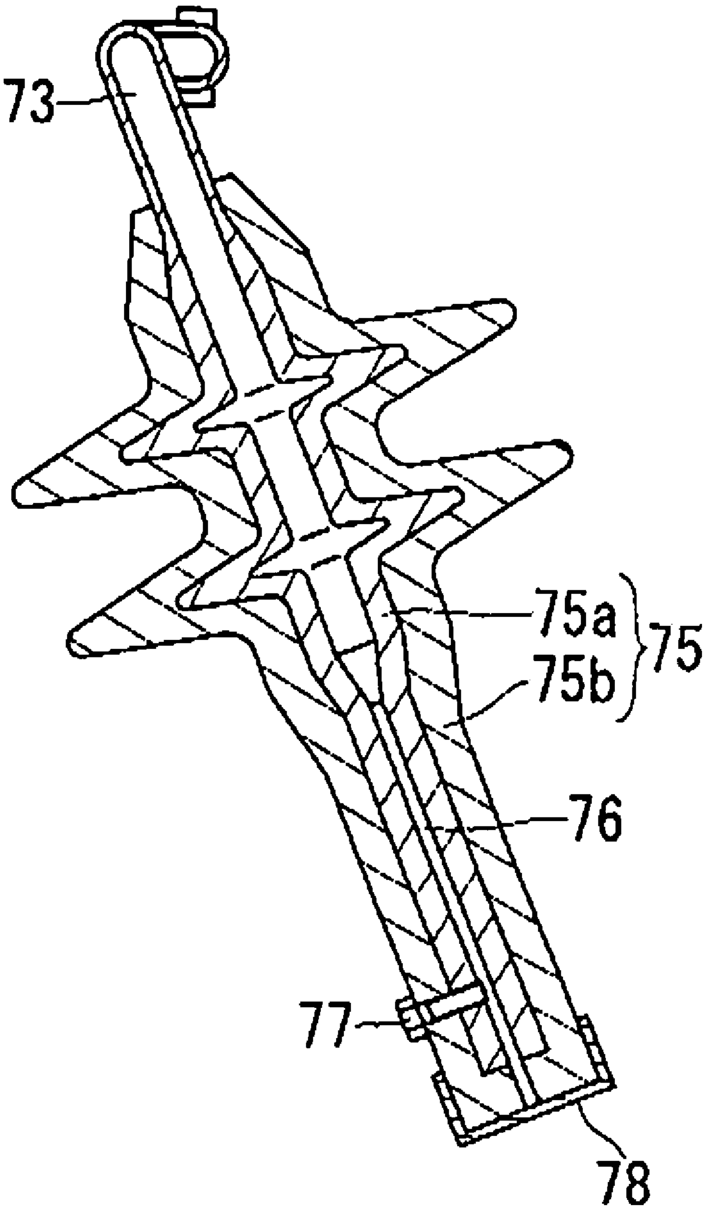
FIG. 21 is a longitudinal sectional view for showing a conventional arcing horn.

The cap 30 shown in FIGS. 19A and 19B illustrating an eighth modified embodiment, for example, illustrates a constitution of the embodiment on the assumption of the arcing horn system to be annexed to the pulling resistant insulator set. In this case, the front end side of the arcing horn system is arranged substantially horizontally. Then, according to the present embodiment, as shown in FIG. 19A, the cap 30 in an umbrella shape is provided to only cover the upper part of the above mentioned space of this front end portion. Alternatively, according to the illustrated embodiment, this cap 30 is integrally formed on this circle coated portion 22*d* as elongating the upper peripheral edge of the above mentioned circle coated portion 22*d* in the insulative member 14 forward. However, the constitution may be possible such that the cap 30 as described above is formed separately and this cap 30 is attached on the circle coated portion 22*d*.

The above described cap 30 is formed in a hemispherical shape along a spherical surface and the rain water R flows down along this spherical surface. Accordingly, the rain water does not flow to the center of the front end portion of the insulative member 14, so that the intrusion of the rain water into the air vent 21*a* is prevented. Alternatively, as shown in FIG. 19B, this cap 30 is provided in an area that is evacuated from a position on the extension of the air vent 21*a* upward as a shape such that the lower edge center side is inflected upward. Accordingly, according to the present embodiment, the entire lower side including a position on the extension of the air valve 21*a* is released, so that opening means for allowing the blowoff of the arc jet from the air valve 21*a* is formed. According to such a constitution, as same as the above described respective embodiments, the dynamic current shutoff capability is repeatedly maintained for each thunder stroke.

The specific embodiments according to the present invention is described as above. However, the present invention is not limited to the above described embodiments but it is possible to modify these embodiments variously within the range of the present invention. For example, according to the above described embodiment, in the drawings except for FIGS. 19A and 19B, the arcing horn system to be annexed to the suspension type insulator set is taken as an example. However, it is also possible to apply the inventions other than those shown in FIGS. 19A and 19B to the arcing horn system to be annexed to the pulling resistant arcing horn system.

What is claimed is:

1. An arcing horn system, in which an insulative tube (21) for surrounding a front end side of an arcing horn (11), (12) is provided and an air vent (21*a*) communicating from a front end portion of said arcing horn (11), (12) to a front end surface of said insulative tube (21) is formed on said insulative tube (21), so that the arc jet is blown off from said air vent (21*a*) upon the flashover in accordance with the thunder stroke;

wherein said insulative tube (21) is made of a polyamide resin.

2. An arcing horn system according to claim 1, wherein said insulative tube (21) is made of a monomer-cast nylon.

3. An arcing horn system according to claim 1 or claim 2, wherein, when a hole diameter of said air vent (21*a*) is defined as d (mm) and the maximum accident current to be shutoff is defined as Ir (A), they are represented as $$d\ Ir/2500+2.$$

4. An arcing horn system according to claim 1 or claim 2, wherein, when a hole diameter of said air vent (21*a*) is defined as d, a length is defined as L and the maximum accident current to be shutoff is defined as Ir (A), they are set as $$d/L(9\ 10^{-6})Ir+0.07.$$

5. An arcing horn system according to claim 4, wherein d/L is set in the range of d/L 0.07.

6. An arcing horn system according to claim 1 or claim 2, wherein an area, of which outer diameter is smaller than'that of a base end side, is provided at the front end side of said insulative tube (21), an insulative tube (21) is formed in this area and a front end portion of the arcing horn is placed in a large diameter area (21*b*) at abase end side in said insulative tube (21), so that said insulative tube (21) is attached to said arcing horn (11), (12).

7. An arcing horn system according to claim 1 or claim 2, wherein a male thread (20*a*) is formed at an outer periphery at a front end side of said arcing horn (11), (12) and this male thread (20*a*) is screwed into the further base end side than said air valve (21*a*) in said insulative tube (21), so that said insulative tube (21) is attached to said arcing horn (11), (12).

8. An arcing horn system according to claim 1 or claim 2, wherein an outer peripheral surface of said insulative tube (21) is coated with a coating layer (22) and crimp portions (22*a* to 22*c*) are integrally formed on this coating layer (22) as extending in just about a disc form.

9. An arcing horn system according to claim 8, wherein said coating layer (22) is made of an insulative material that is softer than said insulative tube (21).

10. An arcing horn system according to claim 8, wherein said plural crimp portions (22*a* to 22*c*) are disposed along an axial center direction of said insulative tube (21) and a diameter of the crimp portion (22*b*), (22*c*) at the base end side is smaller than that of the crimp portion (22*a*) at the furthest front end.

11. An arcing horn system comprising a ground side arcing horn (11) and a electric line side arcing horn (12) to be attached to the opposite sides of an insulator set (1) as being opposed with each other;

wherein insulative members (13) and (14) are provided at respective front end sides of said ground side arcing horn (11) and said electric line side arcing horn (12), respectively and air vents (21*a*) are formed on these insulative members (13) and (14) as communicating from the front ends of said arcing horns (11) and (12) to the front end surfaces of said insulative members (13) and (14); and the arc jet is blown off from respective air vents (21*a*) when the arc is generated between the front ends of both arcing horns (11) and (12) upon the thunder stroke.

12. An arcing horn system according to claim 11, wherein said respective insulative members (13) and (14) are provided so that center lines of said respective air vents (21*a*) are placed at a blunt angle, so that the arc jets to be blown off through respective air vents (21*a*) are crisscrossed with each other.

13. An arcing horn system according to claim 12, wherein the opening angle between the center lines of respective air vents (21*a*) is not more than 130 degrees.

14. An arcing horn system according to claim 13, wherein the opening angle between the center lines of respective air vents (21*a*) is more than 100 degrees.

15. An arcing horn system according to any one of claims 11 to 14, wherein at least one of said ground side arcing horn (11) in a bar and said electric line side arcing horn (12) in a bar is formed in such a manner that a base end portion (11*a*), (12*a*) of which one end side is fixed to said insulator set (1), a middle portion (11*b*), (12*b*) and a front end portion (11*c*), (12*c*) to which said insulative member (13), (14) is attached as placing said air vent (21*a*) on the same axis are sequentially continued; and a connection place of said base end portion (11*a*), (12*a*) and said middle portion (11*b*), (12*b*) and a connection place of said middle portion (11*b*), (12*b*) and said front end portion (11*c*), (12*c*) are inflected, respectively, so that the center line of said air vent (21*a*) and the center line of said base end portion (11*a*) (12*a*) are not placed on the same plane.

16. An arcing horn system according claim 15, wherein a connection place of said base end portion (11*a*), (12*a*) and said middle portion (11*b*), (12*b*) are inflected so that said base end portion (11*a*), (12*a*) and said middle portion (11*b*), (12*b*) are continued substantially in a L-shape; and a connection place of said middle portion (11*b*), (12*b*) and said front end portion (11*c*), (12*c*) are inflected in a different direction from the inflecting direction at the connection place of said base end portion (11*a*), (12*a*) and said middle portion (11*b*), (12*b*) so that these middle portion (11*b*), (12*b*) and front end portion (11*c*), (12*c*) are continued substantially in nearly V-shape.

17. An arcing horn system, in which an insulative member (14) for surrounding a front end side of an arcing horn (12) and an air vent (21*a*) communicating from a front end portion of said arcing horn (12) to a front end surface of said insulative member (14) is formed on said insulative member (14);

wherein a cap (30) for covering the front end side of said insulative member (14) is disposed so as to prevent the intrusion of the rain water into said air vent (21*a*); and said cap (30) is provided with opening means for allowing the blowoff of the arc jet through a wall portion (32) on this wall portion (32) that crisscrosses a blowoff path of the arc jet to be blown off from said air vent (21*a*) to the front end side upon the flashover by the thunder stroke.

18. An arcing horn system according to claim 17, wherein said opening means is formed in such a manner that a movable body (36) is disposed on said wall portion (32) of said cap (30), which is capable of displacing between an evacuation position for evacuating said movable body from the blowoff path of the arc jet as being depressed by the blowoff power of the arc jet and a rain water intrusion preventing position for preventing the intrusion of the rain water as being placed on the blowoff path.

19. An arcing horn system according to claim 18, wherein one end side of said movable body (36) is connected to the circumference of said cap (30) and other end side thereof is made of an elastic body that is elastically transformed along the blowoff direction by the blowoff power of the arc jet.

20. An arcing horn system according to claim 18 or claim 19, wherein said wall portion (32) of said cap (30) is formed in such a manner that sectioned pieces (32*a*) that are sectioned by a plurality of slits (35) adjoin with each other; and these sectioned pieces (32*a*) are formed as said movable body (36).

21. An arcing horn system according to claim 17, wherein a penetration hole (34) is defined on an area on the blowoff path of the arc jet in said wall portion (32) of said cap (30), so that said opening means is formed.

22. An arcing horn system according to claim 21, wherein a projection (45) projecting to the front end side of said cap (30) is disposed on said wall portion (32) of said cap (30), so that said penetration hole (34) is defined on this projection (45).

23. An arcing horn system according to any one of claims 17-19 or 21-22, wherein a space (33) is provided between said wall portion (32) of said cap (30) and he front end surface of said insulative member (14); and a water drain opening (37) is defined on the peripheral wall of the cap surrounding this space (33).

24. An arcing horn system according to claim 23, wherein a projection (46) is provided on the front end surface of said insulative member (14) as projecting forward; and the front end opening portion of this projection (46) is defined as an arc jet blowoff port.

* * * * *